US006942107B2

(12) United States Patent  
Neubert

(10) Patent No.: US 6,942,107 B2  
(45) Date of Patent: Sep. 13, 2005

(54) GLOVE HOLDING MEMBER FOR SUPPORTING PROTECTIVE GLOVES FOR TRANSPORTATION AND/OR CLEANING

(75) Inventor: Bent Neubert, Holte (DK)

(73) Assignee: Gjerstrup Trading A/S, Birkerod (DK)

( * ) Notice: Subject to any disclaimer, the term of this patent is extended or adjusted under 35 U.S.C. 154(b) by 247 days.

(21) Appl. No.: 10/032,065

(22) Filed: Dec. 31, 2001

(65) Prior Publication Data

US 2002/0104554 A1 Aug. 8, 2002

Related U.S. Application Data

(63) Continuation of application No. PCT/DK00/00357, filed on Jun. 30, 2000.

(30) Foreign Application Priority Data

| Jul. 2, 1999 | (DK) | .......................................... | 1999 00959 |
| Aug. 18, 1999 | (DK) | .......................................... | 1999 01139 |
| Nov. 1, 1999 | (DK) | .......................................... | 1999 01567 |
| Dec. 22, 1999 | (DK) | .......................................... | 1999 01846 |

(51) Int. Cl.[7] .................................................. A47F 7/00
(52) U.S. Cl. ..................... 211/13.1; 211/85.31; 211/37; 211/189; 280/79.3
(58) Field of Search ............................... 211/85.3, 13.1, 211/37, 36, 181.1, 34, 106, 119.008, 119.003, 189, 175, 85.31, 85.26, 85.24, 127.1; 280/79.3; 223/78, 52, 88–91, 120; 34/103, 104; 452/185; 15/268; 134/25.1, 25.2, 25.4, 32, 137; 269/37, 55

(56) References Cited

U.S. PATENT DOCUMENTS

| 954,678 | A | * | 4/1910 | Justus | .......................... | 211/33 |
| 1,221,165 | A | * | 4/1917 | Gillam | .......................... | 223/80 |
| 1,319,579 | A | * | 10/1919 | Gillam | .......................... | 223/78 |
| 2,123,523 | A | * | 7/1938 | Clyde | .......................... | 223/80 |
| 2,134,974 | A | * | 11/1938 | Hurwitz | .......................... | 40/411 |
| 2,219,145 | A | * | 10/1940 | Wolf | .......................... | 211/85.3 |
| 3,096,008 | A | * | 7/1963 | Schumacher | .................. | 223/78 |
| 3,133,682 | A | * | 5/1964 | Sawyer | .......................... | 223/78 |
| 3,166,439 | A | * | 1/1965 | Dennhoffer | .................. | 34/103 |
| 3,409,142 | A | * | 11/1968 | Mechaneck | ................. | 211/85.3 |
| 3,486,670 | A | * | 12/1969 | Sutton | .......................... | 223/78 |
| 4,638,915 | A | * | 1/1987 | Kaplan | ...................... | 211/85.3 |
| 4,689,897 | A | * | 9/1987 | Marsalona | .................... | 34/103 |
| 4,866,845 | A | | 9/1989 | McEvily | | |
| 5,103,985 | A | * | 4/1992 | Davis | .......................... | 211/37 |
| 5,125,169 | A | * | 6/1992 | Bader | .......................... | 34/103 |
| 5,199,188 | A | * | 4/1993 | Franz | .......................... | 34/105 |
| 5,230,357 | A | * | 7/1993 | Sisson | .......................... | 134/85 |
| 5,497,798 | A | * | 3/1996 | Fritz et al. | .................. | 134/151 |
| 5,845,661 | A | * | 12/1998 | Leppo | .......................... | 134/89 |
| D413,456 | S | * | 9/1999 | Huang et al. | ................. | D6/412 |
| 6,085,436 | A | * | 7/2000 | Peet | .............................. | 34/104 |
| 6,416,718 | B1 | * | 7/2002 | Maiefski et al. | ............ | 422/103 |

FOREIGN PATENT DOCUMENTS

| DE | 198 19 288 C1 | 3/1999 |
| EP | 0 641 612 A1 | 3/1995 |
| FR | 2 565 854 | 12/1985 |
| FR | 2 676 078 | 11/1992 |

* cited by examiner

*Primary Examiner*—Jennifer E. Novosad  
(74) *Attorney, Agent, or Firm*—Sughrue Mion, PLLC

(57) ABSTRACT

A method and a system for transporting and cleaning slaughter equipment especially knives (3), gloves and aprons at slaughterhouses, the system comprising knife holding members for receiving and releasable holding one or more knives (3), glove holding members for receiving and releasable holding the gloves, apron holding members for receiving and releasable holding the aprons and a cleaning installation for cleaning the knives and/or gloves and/or aprons and/or the holding members. The holding members may be transported on trolleys, and the knife holding members may comprise a basked (4), wherein the knives are positioned so that the blunt knives have a different orientation than the other knives. The basket (4) may be positioned on the trolley on projections (26') through the handgrips (13).

10 Claims, 22 Drawing Sheets

Principle plan of a central washing system for knives, tools etc. coupled up with a knife grinding system.

Principle plan of a central washing system for knives, tools etc. coupled up with a knife grinding system. Without central trolleys.

Principle plan of a central washing system for gloves and aprons

Fig. 7a
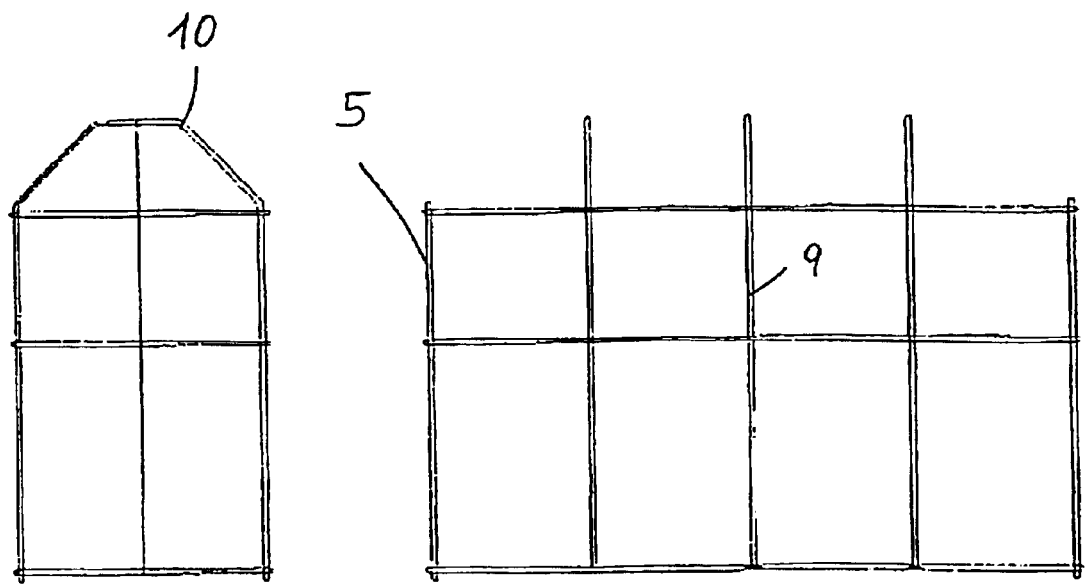
Fig. 7b
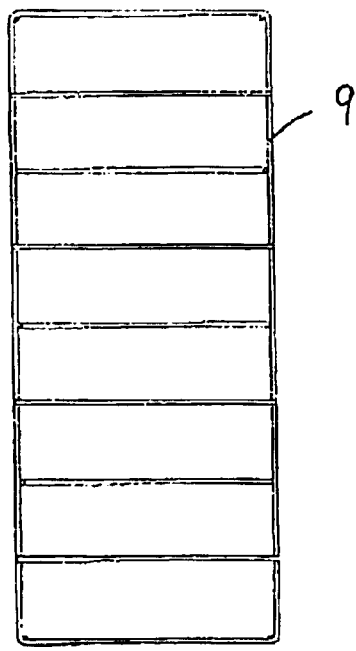
Fig. 7c

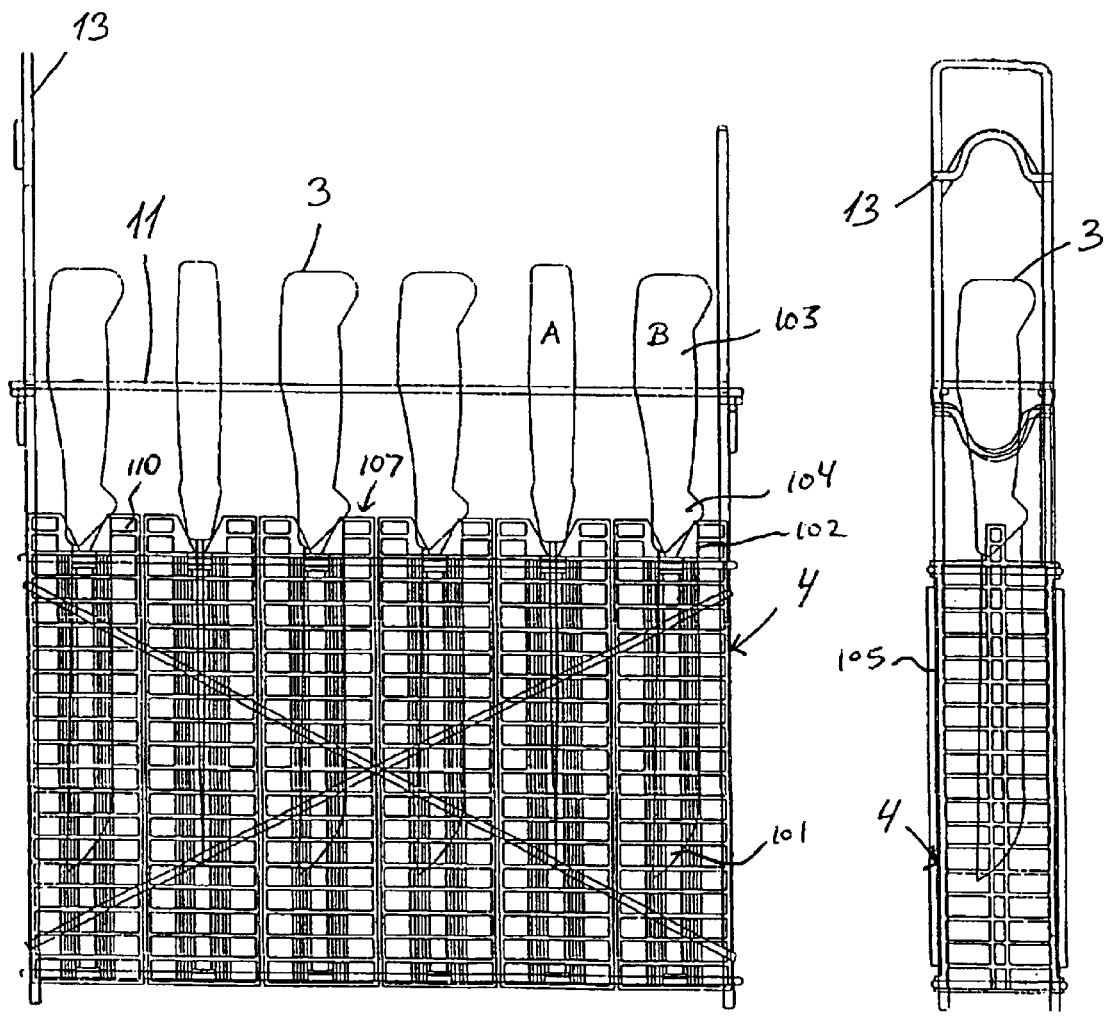
Fig. 8a
Fig. 8b
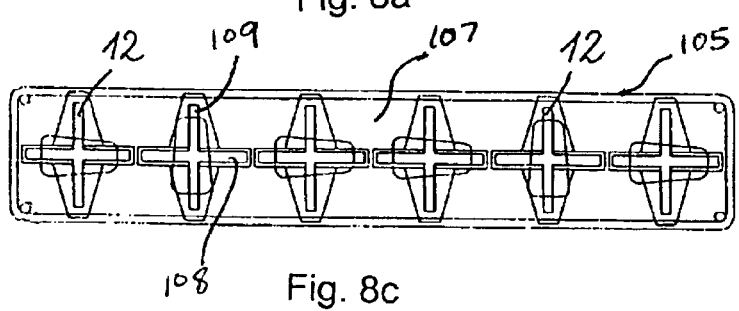
Fig. 8c

Fig. 9c(1)
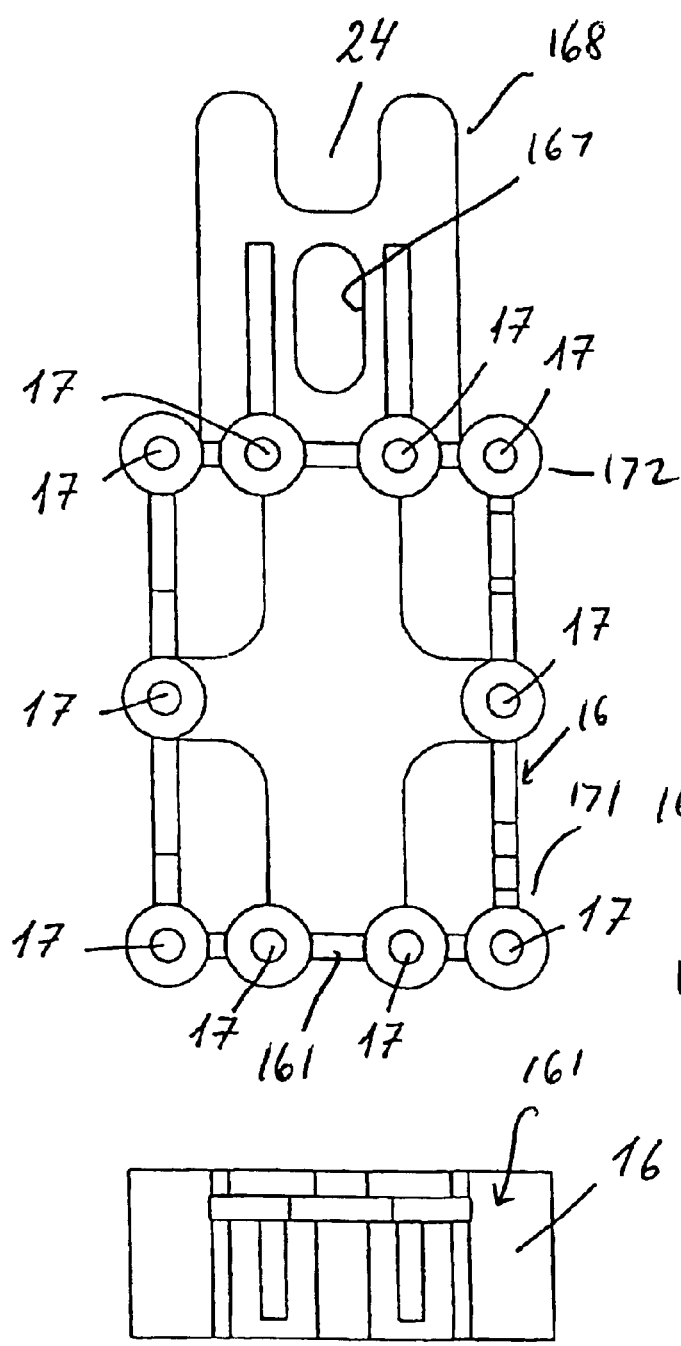
Fig. 9c(2)
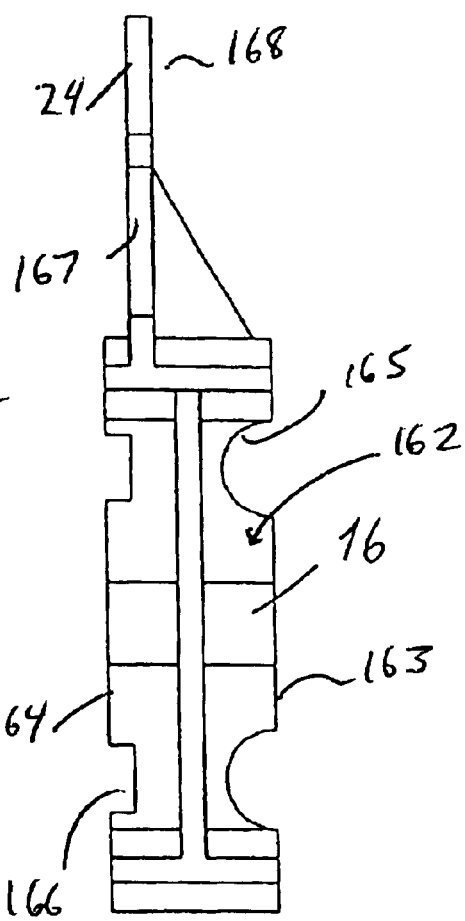
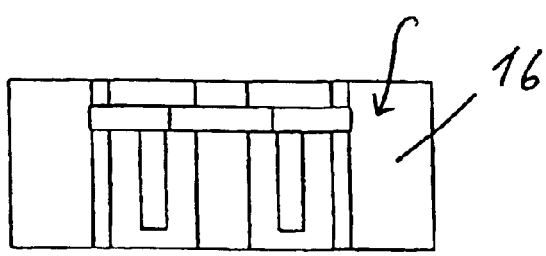
Fig. 9c(3)

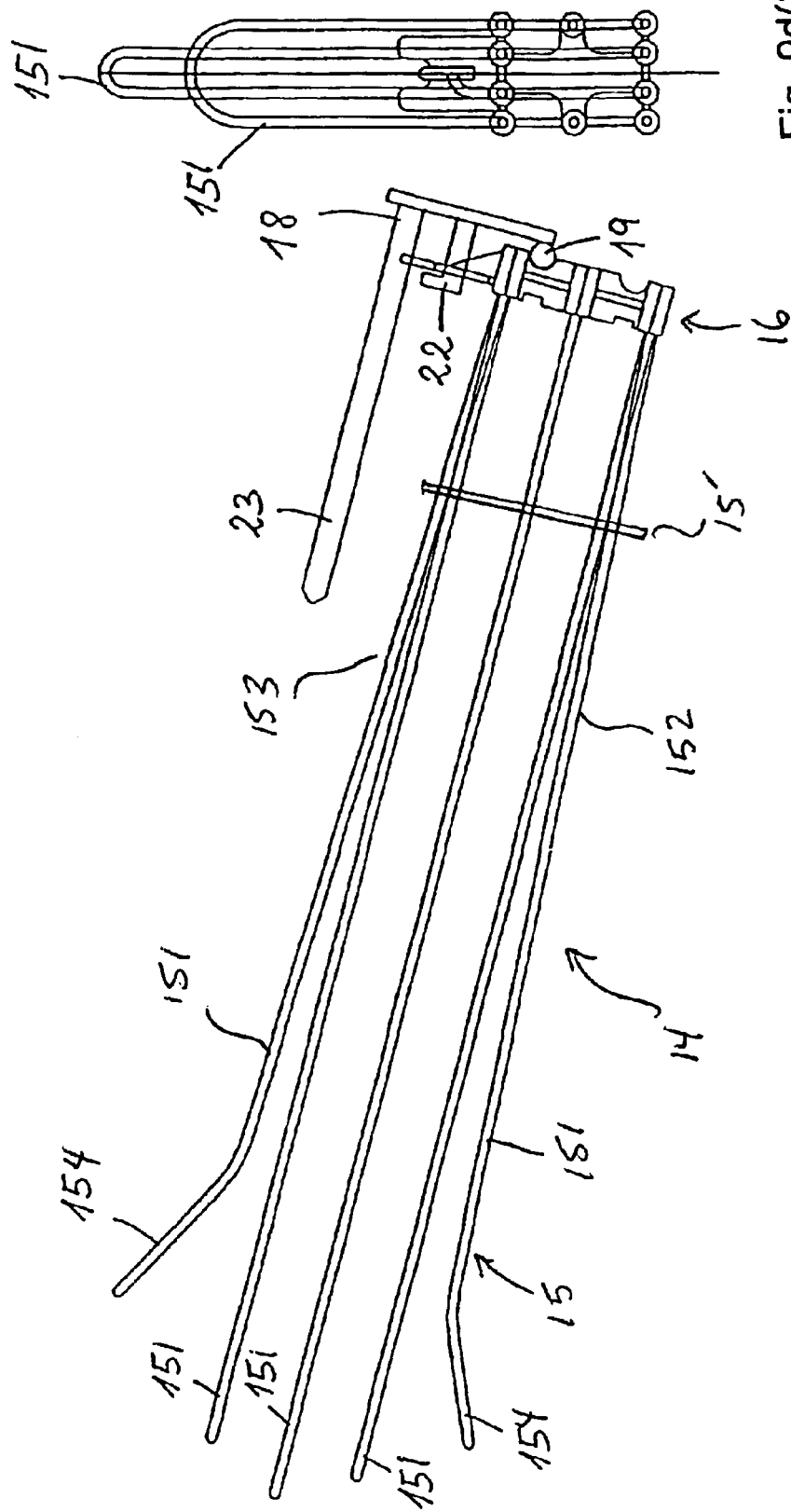

GLOVE HOLDING MEMBER FOR SUPPORTING PROTECTIVE GLOVES FOR TRANSPORTATION AND/OR CLEANING

The application is a continuation of International Application No. PCT/DK00/00357, whose International filing date is Jun. 30, 2000, which was published under PCT Article 21 (2) in English, the disclosure of which Application are incorporated by reference herein.

The invention relates to a method and a system for transporting and cleaning slaughter equipment, especially knives, gloves and aprons at slaughterhouses.

BACKGROUND OF THE INVENTION

In slaughterhouses the equipment for the personal cutting out/boning the animals comprises e.g., one or more knives, steel gloves, coats of mail (aprons) and other hand tools which all need to be cleaned often for hygienic reasons. It is well known that when the equipment is to be cleaned, and the knife needs to be ground, the person himself cleans it and grinds the knife or at least brings it to the washing/grinding department. Thus, it costs time and therefore a lower effectiveness at slaughterhouses Furthermore, the user does not receive his own equipment after it has been cleaned/ground, as the equipment often is not provided with any kind of identification.

It is known to clean equipment at slaughterhouses, wherein e.g. the gloves and aprons are cleaned in one cleaning installation, such as in a drum washer, and the knives are cleaned in another cleaning installation.

It is known to position knives in baskets, wherein all knives are positioned with the same orientation, which makes it difficult for the grinder to distinguish the knives that need to be ground from the knives that only need to be cleaned.

DESCRIPTION OF THE INVENTION

Thus, it is an object of the present invention to provide a method and a system for transporting and cleaning slaughter equipment, wherein the equipment is transported and cleaned in a handsome and rational way that optimises the effectiveness and safety for the user and for the cleaning and grinding department. Further, the present invention shall provide a method and a system, wherein bottlenecks are eliminated or at least reduced in both the production, the cleaning department and in the grinding department, and wherein time and money is saved while simultaneously keeping the hygiene at a high level.

Further, the invention shall provide a transporting and cleaning system that may be adapted to a central grinding system at slaughterhouses, and wherein the system has a high flexibility so that it quickly and simply can be adapted to different places of work, different numbers of workers and/or different workers.

It is a further object of the present invention to provide a method and a system, wherein each user receives his/her own equipment from the cleaning/grinding department.

According to a first aspect, the invention relates to a method for transporting and cleaning slaughter equipment, said method comprising:

a) positioning one or more knives on one or more knife holding members, and/or b) positioning one or more gloves on one or more glove holding members, and/or c) positioning one or more aprons on one or more apron holding members, and d) transporting one or more first trolleys with said holding members mounted thereon through a cleaning installation for cleaning the knives and/or the gloves and/or the aprons.

Preferably, the holding members are realisably mounted to the one or more first trolleys, and wherein the method further comprises, prior to step d), the step of:

positioning the knife and/or the glove and/or the apron holding members on the one or more first trolleys.

The knives that need to be ground may be positioned in the knife holding member at another level and/or with another orientation than those knives that do not need to be ground, and the method may further comprise, prior to step d), the steps of:

picking out the knives that need to be ground from the knife holding member and positioning them on one of more second trolleys, transporting said second trolleys with knives through an arrangement of sluicing members for rinsing of the knives before being ground, transporting said second trolleys to a knife grinding system, where the knives are ground, and transporting said second trolleys with the ground knives to said cleaning installation and positioning the ground knives in the knife holding members at the first trolley.

The second trolleys may be positioned near the first trolleys, and the knives are preferably positioned in partitions on the second trolleys, In the grinding system the knives may first be grind hollowed and burnished and subsequently ground and burnished. Finally, the knives are positioned on the second trolley.

Furthermore, the method may comprise the step of positioning said one or more first trolleys with the cleaned/ground knives and/or gloves and/or aprons and the holding members in an area where they can be picked up for use.

Preferably, the cleaning installation comprises nozzles for sluicing/sprinkling/blowing liquids and/or steam on the knives and/or gloves and/or aprons positioned on the first trolley, and the cleaning in the cleaning installation may comprise the step of:

sluicing the knives and/or the gloves and/or the aprons with water, and/or sprinkling the knives and/or the gloves and/or the aprons with water containing enzymes for biodegrading impurities, and/or sluicing the knives and/or the gloves and/or the aprons with water mixed with a detergent, and/or blowing in steam on the knives and/or the gloves and/or the aprons, and/or sluicing the knives and/or the gloves and/or the aprons with water mixed with a disinfectant.

Alternatively, the following four steps may be provided in arbitrary order:

sluicing the knives and/or the gloves and/or the aprons with water, sprinkling the knives and/or the gloves and/or the aprons with water containing enzymes for biodegrading impurities, sluicing the knives and/or the gloves and/or the aprons with water mixed with a detergent, blowing in steam on the knives and/or the gloves and/or the aprons.

Preferably, the step of rinsing the knives before being ground may be provided in the cleaning installation, but alternatively the knives may be rinsed in a separate cleaning installation only used for rinsing knives.

Additionally or alternatively, the method may further comprise the step of circulating water around the equipment so as to loosen impurities therefrom, and wherein the circulation of water is provided by pumping water into a watertight enclosure surrounding the equipment Preferably, the watertight enclosure comprises a basin containing the knives and/or gloves and/or aprons, and wherein air may be pumped into the water for providing an improved circulation.

In case the equipment is cleaned with steam as described above, the method may further comprise, subsequently to the step of blowing in steam, the step of:

sucking out any surplus steam from the cleaning installation and drying the knives and/or gloves and/or aprons.

The above-mentioned method is preferably used at slaughterhouses where it is important to have a large transporting and cleaning system for obtaining a sufficient capacity and effectiveness. It should be understood that the method could be adapted to transport and clean other equipment than knives, gloves and aprons. Any tool may be transported on holding members made for this purpose and positioned on the first and/or second trolleys.

According to a second aspect, the present invention relates to a method for transporting and cleaning slaughter equipment, said method comprising the steps of:

a) positioning one or more knives or gloves or aprons on one or more knife or glove or apron holding members, respectively, and b) positioning the one or more holding members on one or more first trolleys, c) transporting said trolleys to a cleaning installation, d) positioning the one or more holding members in the cleaning installation and cleaning the equipment, and e) positioning the holding members with the cleaned equipment on the first trolleys.

The knives that need to be ground may be positioned in the knife holding members at another level and/or with another orientation than those knives that do not need to be ground, and wherein the method further comprises, subsequently to step e), the steps of:

transporting said first trolleys to a knife grinding system, where the knives are ground, and transporting said first trolleys with the ground knives into said cleaning installation and cleaning the ground knives.

The method may further comprise the step of positioning said first trolleys with the cleaned equipment in an area where the knives can be picked up for use.

According to the above-mentioned methods, the knife holding members may be positioned on the first trolleys in an angle of between 0° and 90° in relation to vertical, and wherein the method comprises the step of positioning the knife holding members on first securing means that are adapted to secure the knife holding members in relation to the first trolley within said angle interval.

Furthermore, the glove holding members may be positioned on the first trolleys in an angle of between 0° and 90° in relation to vertical, and wherein the method comprises the step of positioning the glove holding members on second securing means that are adapted to secure the glove holding members in relation to the first trolley within said angle interval.

The equipment may be positioned on the holding members on the trolleys and cleaned in the cleaning installation while it is positioned on the trolleys, or it may be positioned on the holding members and cleaned in the cleaning installation while it is positioned in the holding members only and not on the trolleys. Further, each trolley may be intended for knives or gloves or aprons or other tools or clothes only, or it may be intended both for the knives, gloves and aprons.

According to a third aspect, the present invention relates system for transporting and cleaning slaughter equipment, and wherein the system comprises knife holding members for receiving and realisably holding one or more knives, and/or glove holding members for receiving and realisably holding the gloves, and/or apron holding members for receiving and realisably holding the aprons, and a cleaning installation for cleaning the knives and/or gloves and/or aprons and/or the holding members.

Preferably, the knives are positioned In the knife holding members with different orientations and/or at different levels, so as to distinguish the knives that need to be ground from the other knives.

For transporting the equipment, the system may comprise one or more first trolleys onto which each of the holding members may be mounted. Preferably, the holding members are realisably mounted to the first trolleys, so that the user may bring his holding members from the trolley to his working place. Alternatively, the holding members may be fixed mounted to the trolleys.

Preferably, the knife holding member comprises a plurality of partitions for receiving the knives, and wherein one or more of the partitions comprise receiving means for positioning the knife with a different orientation and/or at a different level, so that the knife can be distinguished from the other knives. Preferably, the partitions are provided in one or more baskets that may be realisably positioned on the first trolleys. In a preferred embodiment, each user has his own basket. It is an advantage that each user has his own basket, whereby he receives his own knives when they return from the cleaning and/or grinding department. For ensuring that the basket always return to the same person, it may comprise an Interchangeable plate indicating knife-user identification and/or the angle of the knife-edge and/or the user's department and name, etc. Preferably, each basket comprises one, two, three, four, five or more partitions, such as ten, twenty, forty, fifty or more.

The one or more knives may be positioned between 5 mm and 15 mm higher than one or more of the other knives in the knife holding member and/or turned in an angle of between 1° and 90° in relation to the one or more other knives in the basket.

In a specific embodiment, each knife holding member may comprise a carrier into which a plurality of baskets may be positioned. Preferably, each carrier is adapted to hold one basket or more, such as two, three, four, five, six, seven or more, such as ten, twenty, or thirty. The carriers may be adapted to be positioned on the first trolley in an angle of between 0° and 90° in relation to vertical.

In case a knife needs to be ground, it may be positioned in the partition in the basket with a different orientation and/or at another level so that it sticks further up and/or is turned e.g. 90° in relation to the knives that only need to be cleaned and not ground. Thus, it is easier for the grinder to locate the knives when picking them out for grinding.

Preferably, each basket may comprise an interchangeable holder for holding the handle of the knives, so that the knives do not rush out of the basket. The holder may further comprise a knife-edge protector that protects the knife-edge when sticking the knives into the partition of the basket. Preferably, the interchangeable holder is made of steel and coated with a synthetic material that constitutes the knife-edge protector.

Preferably, each glove holding member is adapted to hold a glove in an angle between 0° and 90° in relation to vertical. In a preferred embodiment, the glove holding member is human hand shaped and adapted to distend the glove in all directions, so as to obtain a better cleaning of the gloves. The hand shaped form may be provided by mounting five bars onto a base, and wherein each bar has a finger-like shape, so that the five bars together form a human hand. Each bar may have the thickness of a finger or it may be bent into a curve forming the finger-like shape and thus mounted in said base in its two ends.

Alternatively, the human hand shape may be provided by solid material, such as foamed plastic.

Preferably, the five fingers are spread out to distend the glove. For making it easier to pull the glove over the fingers a ring may surround the five bent bars for spreading out/bringing together the fingers. The ring may be adapted to be displaced along the bars so as to bring the bars together when it is displaced towards the "fingertips" of the bars, and so as to let the bars spread out when it is displaced away from the fingertips and towards the base.

Preferably, the base comprises mounting means for mounting the holding member to a first trolley, and the mounting means may comprise one or more holes provided in the base for hanging the member on the first trolleys. The first trolley may comprise projections onto which the base with the glove may be hung.

Preferably, the base is made of plastic, but alternatively it may be made of steel or composite material, and the glove holding member may comprise an interchangeable plate indicating glove-user identification and/or the user's department and name, etc. In a preferred embodiment, each user has his own glove holding member.

Preferably, the apron holding member comprises rings/straps fastened to the aprons such that the aprons can be hung on the first trolleys. Alternatively, the apron holding members may comprise a basin for containing the aprons and comprising a basin washer, and wherein the aprons may be cleaned by circulating water around the aprons so at to loose impurities therefrom. Air may be pumped into the water for providing an improved circulation. The basin may further contain the gloves, and the basin may be adapted to be positioned on the first trolleys, e.g., by hanging it on hooks mounted on the trolley.

The system may further comprise a knife grinding system and one or more second trolleys for transporting said knives to and from the grinding system, the second trolleys comprising partitions for the knives.

The first trolley may be adapted to transport both the knife and the glove and the apron holding members, so that the equipment may be transported into the cleaning installation on the same trolleys. Alternatively, each of the one or more first trolleys may be adapted to transport only the knife or the glove or the apron holding members which increases the flexibility of the system, as it then is possible, e.g. to clean the knives and grind them without rearranging them from the first trolley to the second trolley and back to the first trolley. Further it will be possible to clean the gloves, aprons, and other equipment individually.

Normally, the knives need to be rinsed before being ground and therefore the system may comprise a sluicing arrangement for sluicing and rinsing the knives before grinding.

The one or more first and second trolleys may comprise wheels or rollers for rolling them over the floor. The first trolleys may have different lengths depending on the number of baskets, bases and/or basins or other tool holding members that need to be positioned thereon. The first trolleys may comprise an identification-plate indicating its department and identification-plates for each user, so that the user can position his basket opposite his plate.

The first trolleys may comprise first securing means for securing the knife and apron holding members in relation to the trolley. Preferably, the first securing means comprise projections, such as bars onto which the baskets, carriers and aprons may be hung, said bars may lock the knives to the baskets when the baskets are hung thereon. The aprons may be hung on said projections in straps/rings mounted on the aprons or the basin for the aprons may be hung on hooks mounted on the trolley.

Further, the one or more first trolleys may comprise second securing means for securing the glove holding members. Preferably, the second securing means comprise second bar members onto which the glove holding members may be hung, e.g., by means of the one or more holes in the base, cf. above. Preferably, the second securing means are adapted to realisably secure the gloves in an angle of between 0° and 90° in relation to vertical.

Preferably, the second trolleys are adapted to transport the knives to and from the knife grinding system, and each of which may transport up to 200 knives at a time.

Preferably, the cleaning installation comprises a plurality of cleaning units, so that the installation can be adapted to the number of trolleys and/or the length of the trolleys that are to be positioned In the installation. Putting the number of units that fit to the number and/or the length of the trolleys together may provide the adaptation.

The cleaning installation may comprise nozzles for sluicing and a control system for controlling activation of the nozzles, and wherein the control system may be adapted to control the activation of the nozzles, so that the number of nozzles to be activated depends on the number and/or the length of the trolleys positioned in the cleaning installation. Further, the nozzles may be activated, such that it is only a part of the trolley that is exposed to the cleaning liquids or steam. If a part of the cleaning installation does not contain a first trolley, the control system may automatically not activate the nozzles positioned in said part of the installation.

The nozzles may sprinkle and/or atomise one or more cleaning liquids and/or steams on the knives and/or gloves and/or aprons positioned on the first trolleys, and the nozzles may be positioned on nozzle holding members that can be moved back and forth over and/or along the sides of and/or below and/or between the first trolleys with the knives and/or gloves and/or aprons.

Preferably, the nozzle holding members comprise one or more nozzle frames, each of which having a plurality of nozzles mounted.

The cleaning liquids and/or steams may comprise water and/or liquids containing enzymes for biodegrading Impurities, and/or detergents and/or hot steam and/or water mixed with a disinfectant, The concentration of the detergents, the disinfectant and enzymes may be varied depending on the dirtiness of the equipment.

In a preferred embodiment, the control system controls the volume of liquid and/or steam being led through the nozzles and which liquid and/or steam being led through the nozzles.

Furthermore, the control system may control the number of times the nozzle frame(s) shall be moved back and forth over and/or along the sides of and/or below and/or between the first trolleys with the knives and/or gloves and/or aprons.

For obtaining a satisfactorily cleaning of the equipment, the temperature of the cleaning steam, when being applied to the knives and/or gloves and/or aprons, may between 10° C. and 200° C., such as between 20° C. and 190° C., such as between 30° C. and 180° C., such as between 40° C. and 170° C., such as between 50° C. and 160° C., such as between 60° C. and 150° C., such as between 70° C. and 140° C., such as between 80° C. and 130° C., such as between 90° C. and 120° C., preferably between 100° C. and 110° C.

The temperature of the cleaning liquids, when being applied to the knives and/or gloves and/or aprons, may be between 10° C. and 100° C., such as between 20° C. and 90° C., such as between 30° C. and 80° C., such as between 40° C. and 70° C., preferably between 50° C. and 60° C.

One cleaning circle may take from 1 minute to 50 minutes, but it may take longer if the equipment is very dirty.

The cleaning installation may comprise any other cleaning apparatuses, such as washing machines known from housekeeping, drum washers, washing installations using brushes, etc.

Any elements, features and functionalities described above in connection the third aspect of the invention may be applied in methods according to the first and second aspect of the present invention.

According to a fourth aspect, the present invention relates to a knife holding member which comprises a plurality of partitions for receiving the knives and wherein one or more of the partitions comprise receiving means for positioning the knife with a different orientation and/or at a different level, so that the knife can be distinguished from the other knives. Preferably, the partitions are provided in one or more baskets, and wherein each basket comprises one, two, three, four, five or more partitions, such as ten, twenty, forty, fifty or more.

The one or more knives may be positioned between 5 mm and 15 mm higher than one or more of the other knives in the knife holding member. Further, the one or more knives may be turned in an angle of between 1° and 90° in relation to the one or more other knives in the holding member.

Alternatively, the knives in the holding member may be positioned with the same orientation and at the same level.

Depending on the need of capacity, the basket may be adapted to hold one knife or more, such as two, three, four, five, six, seven or more, such as ten, twenty, thirty, forty, fifty, sixty, seventy, eighty, ninety or hundred or more.

Each basket may comprise an interchangeable plate indicating knife-user identification and/or the angle of the knife-edge and/or the users department, etc., and an interchangeable holder for the handle of the knife. Said holder for the handle of the knife may comprise a knife-edge protector so as to protect the knife-edge when positioning the knife in the holding member. Preferably, the interchangeable holder is made of steel and coated with a synthetic material that constitutes the knife-edge protector.

According to a fifth aspect, the present invention relates to a glove holding member for receiving and realisably holding a glove in an angle between 0° and 90° in relation to vertical. In a preferred embodiment. the member is human hand shaped and adapted to distend the glove in all directions. A base in which five bars are mounted, each bar having a finger-like shape may provide the human hand shaped member, so that the five bars together form a human hand.

Each bar may have a thickness and form of a human finger, but in a preferred embodiment each bar is bent to form the finger-like shape, and it is mounted in said base in its two ends.

For allowing the user to pull his gloves over the bars, a ring may surround the five bent bars. The ring are adapted to be displaced along the bars so as to bring the bars together when it is displaced towards the "fingertips" of the bars, and so as to let the bars spread out when it is displaced away from the fingertips and towards the base.

Preferably, the base comprises mounting means, such as one or more holes, for mounting the holding member to a first trolley, e.g., by hanging it on securing means on the trolley.

The base may be made of plastic or steel or composite material.

A specific embodiment of the method for transporting and cleaning the equipment will be described below:

When the working hours starts, the user picks up his clean gloves, aprons and his basket with the clean and ground knives positioned on the holding members on the first trolley in a central area of the slaughterhouse and starts to work. At lunchtime or at the end of the day's work, the user positions his knives in the knife holding member (the knives that need to be ground are turned and/or lifted in relation to the other knives) and positions the holding member on a first trolley which may be positioned in a central area of the slaughterhouse. Further, he positions the gloves on the glove holding member and the apron on the apron holding member and hangs the holding members on the first trolley. The trolley is then transported to another area where the baskets comprising blunt knives are positioned in an angle of approximately 45° on the trolley, so that the grinder knows which baskets to pick out. The blunt knives are positioned in partitions on the second trolley, each second trolley being intended for a specific knife-edge or knife-edge angle. The second trolley is transported to the grinding department where the knives are grind hollowed, burnished, ground and burnished (e.g. with a felt disk).

The first trolley is transported to an area where the ground knives are being positioned on the baskets and subsequently, the first trolleys are transported into the cleaning installation/washing machine and finally, the first trolleys with the cleaned equipment are transported to an area where the cleaned equipment can be picked up for use.

It should be understood that any elements, features and functionalities mentioned in connection with the five aspects of the present invention could be combined in any ways. Further, the invention described above may be adapted to transport and clean other equipment, such as any slaughter tool and clothes, and it can be used at other places than slaughterhouses, such as in the fish industry.

The method and the system can integrate a central grinding system for the knives as described above, but the method and the system are not dependent on this.

BRIEF DESCRIPTION OF THE DRAWINGS

Embodiments of the invention will be further described in details below with reference to the drawings, wherein FIGS. 7a–7c show a carrier for baskets according to the invention, FIGS. 8a–8c show a knife holding member according to the invention, FIGS. 9a–9d(2) show embodiments of a glove holding member according to the invention.

DETAILED DESCRIPTION OF THE DRAWINGS

Figure 1:
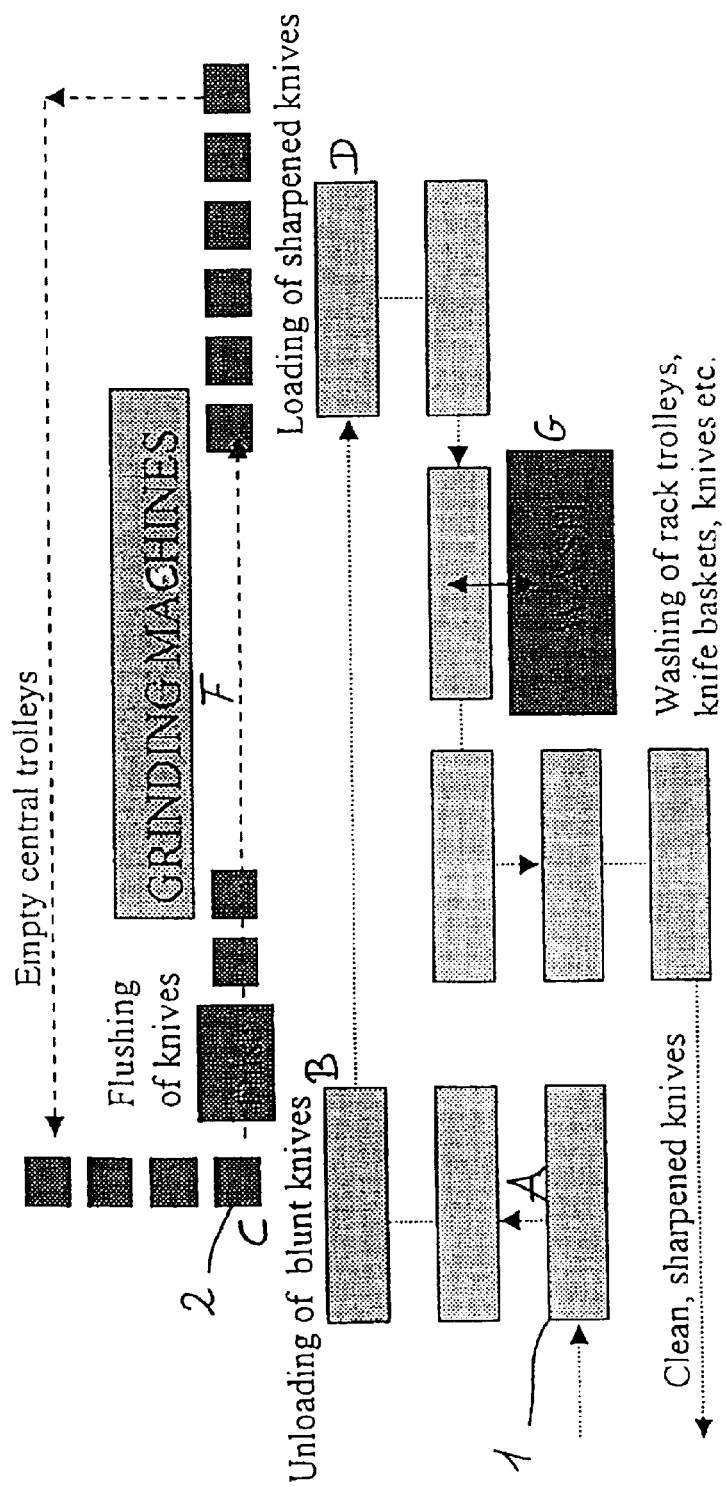
FIGS. 1–4 show flow diagrams for the steps of transporting and cleaning the equipment according to the present invention.

FIG. 1 shows a flow diagram for the steps of transporting and cleaning the equipment according to the invention. The first trolleys ("rack trolleys") 1 with knives, gloves and aprons are transported from point A to point B where the knives to be ground are picked up from the basket and positioned on second trolleys 2 ("central trolleys") at point C. The first trolleys are transported to point D, while the knives at point C are being rinsed/flushed at point C in an arrangement of sluicing members (not shown) and subsequently ground at point F. The ground knives are positioned on the first trolleys at point D, and the first trolleys with the knives, gloves and aprons are transported through the cleaning installation at point G and finally transported to a central area where the equipment can be picked up for use.

Figure 2:
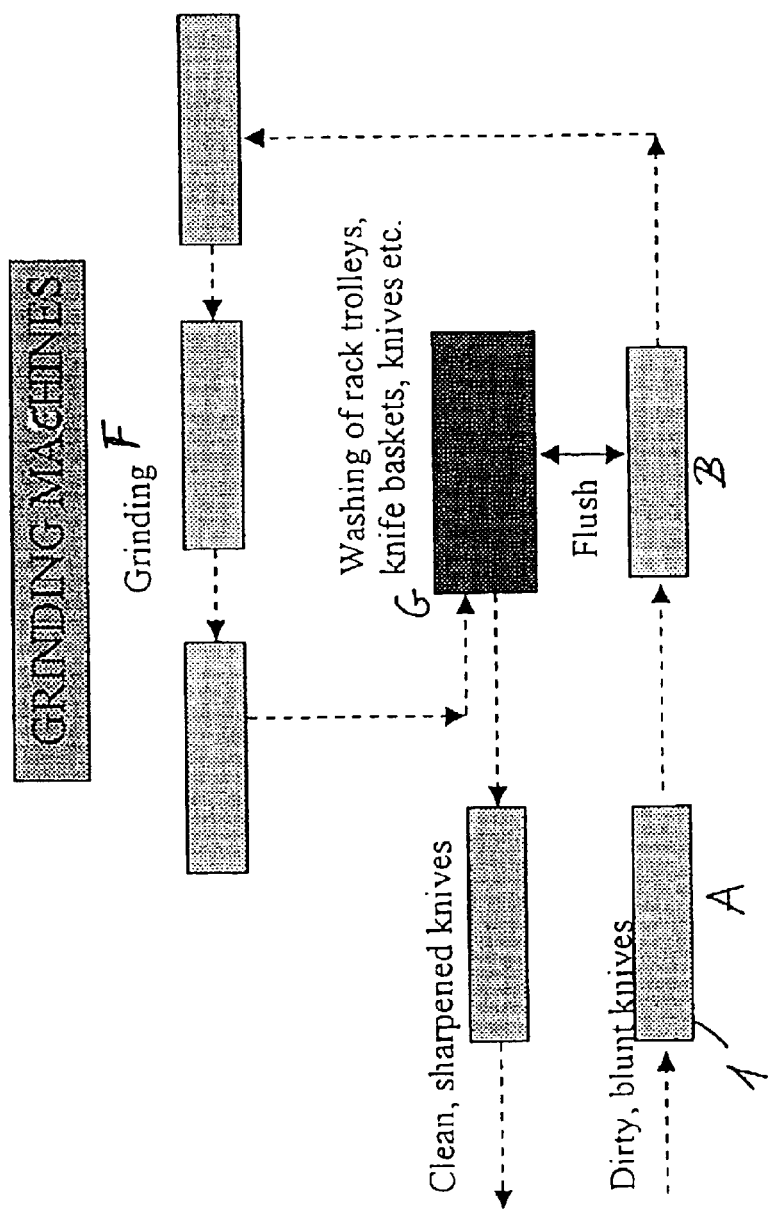
Figure 3:
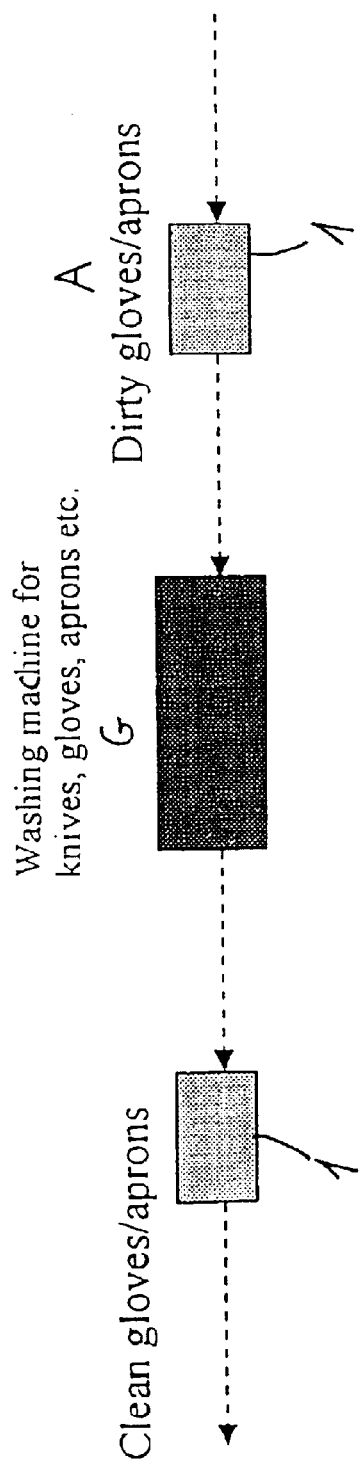

FIG. 2 shows a flow diagram as shown in FIG. 1, but wherein the first trolleys 1 only are used for transporting knives and not gloves and aprons. The first trolleys 1 with knives are transported from point A to point B where they are rinse/flushed in an arrangement of sluicing members (not shown). Subsequently, the knives are ground at point F and washed at point G and finally transported to a central area where the knives can be picked up for use. The knives that do not need to be ground may be transported directly to from point to the central area where the knives can be picked up for use FIG. 3 shows a flow diagram as shown in FIG. 2, but wherein the first trolleys 1 only are used for transporting gloves and/or aprons. The first trolleys 1 with gloves and/or aprons are transported from point A to point G where they are washed and finally transported to a central area where the knives can be picked up for use.

Figure 4:
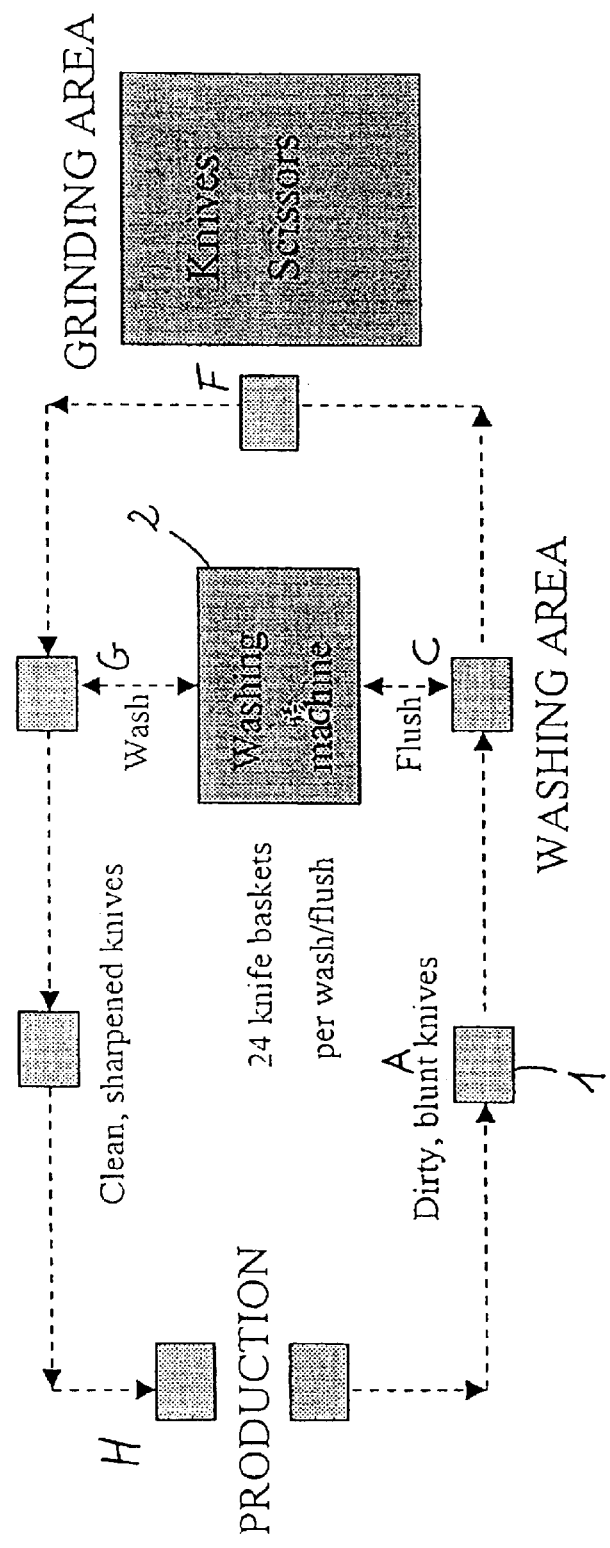

FIG. 4 shows a flow diagram for transporting knives on first trolleys, wherein the washing machine is adapted to contain maximum twenty-four knife baskets. The first trolleys 1 with the baskets holding the knives are transported from point A to C where the baskets with the knives are rinsed/flushed in the cleaning installation 2. The baskets with the knives are then transported to point F where the blunt knives are ground in the grinding area. Subsequently, the trolleys with the knives are transported to point G where they are cleaned and finally transported back to the production area at point H.

Figure 5:
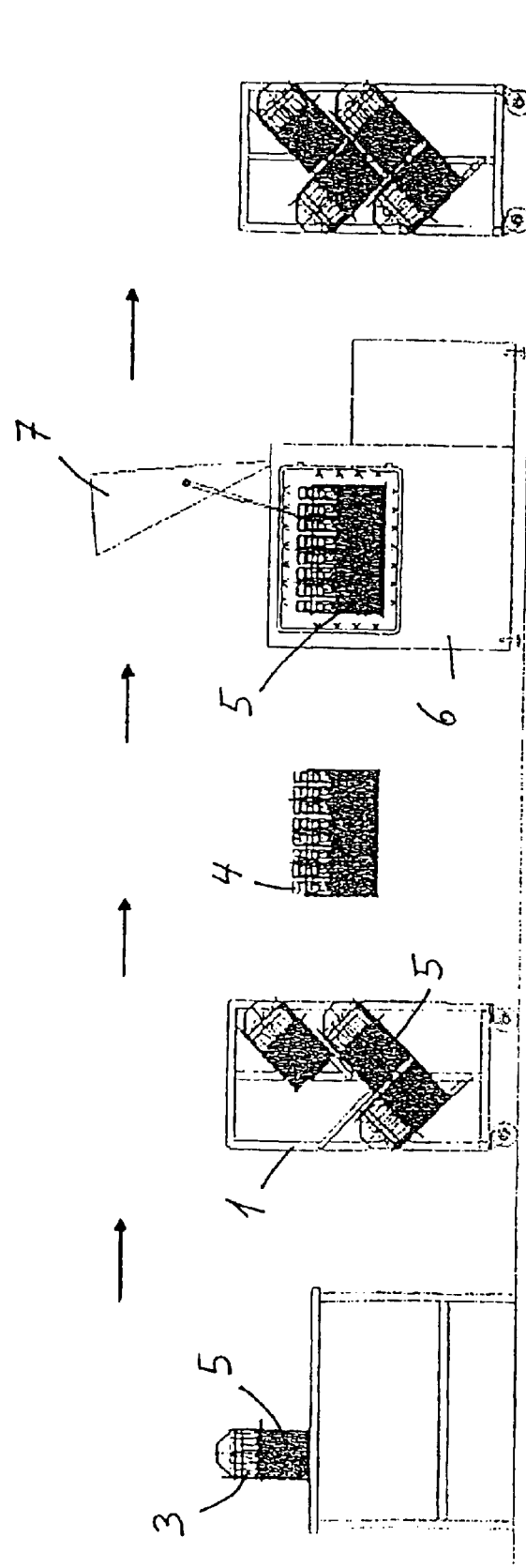
FIG. 5 shows a procedure for transporting and cleaning knives according to the invention.
Figure 6A:
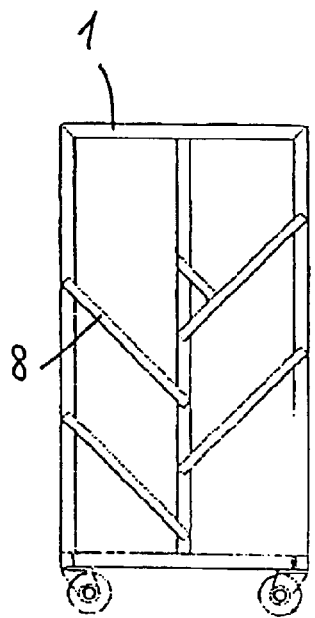
FIGS. 6a–6d show a first trolley according to the invention.
Figure 6B:
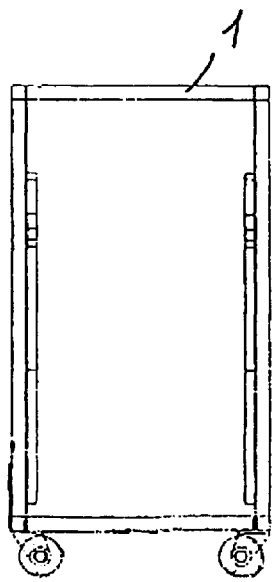
Figure 6C:
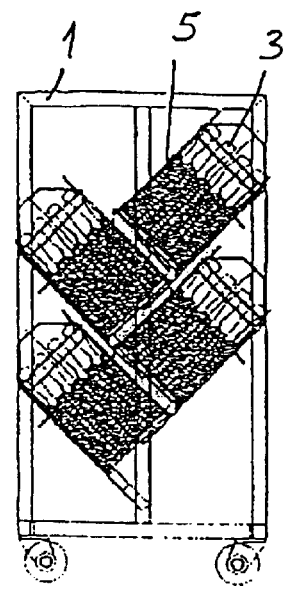
Figure 6D:
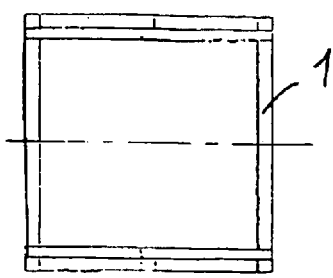

FIG. 5 shows a procedure for transporting and cleaning knives. The knives 3 are positioned in baskets 4 (best seen in FIGS. 8a–8c) in carriers 5 and the carriers are positioned on the first trolleys 1 in an angle of approximately 45° in relation to vertical. Thus, it is easier to remove the carriers from the trolley. The carriers are positioned in the cleaning installation 6 comprising a cover 7. When the knives in the baskets in the carriers are clean, they are positioned on the first trolley again and transported to an area, where each basket can be picked up for use by its user. FIGS. 6a–6c show the first trolley in more detail. The trolley comprises securing means 8 for securing the carriers in said angle, and the trolley comprises wheels or rollers for rolling it over the floor.

FIGS. 7a–7c show a carrier 5 in more detail. The carrier is made of steel bars 9 welded together, and the carrier comprises handgrips 10. Preferably, each carrier contains eight baskets, but it may carry more, such as ten or twenty baskets.

FIGS. 8a–c shows a knife holding member comprising holding means for a predetermined number of processing knives 3 for slaughter ware and of the conventional form comprising a knife blade 101 having a cutting edge 102 and an elongate handle 103 in extension of the blade 101. At the end facing the blade 101 the handle 103 is formed with a protective projection 104 aligned with the cutting edge 102. In the illustrated embodiment the knife holding member comprises a basket 4 containing a single row of six separate elongate compartments 12 defined by external compartment walls 105 and partitions 106 between adjoining compartments. The compartments 12 are adapted for individual protected accommodation of six knives 3, such that the full length of the blade 101 of a knife is accommodated in a compartment 12 with the handle 103 of the knife projecting above an end face 107 of the compartment.

In accordance with the invention each of the compartments 12 in basket 4 is provided with means for accommodation of the knife blade 101 with one of at least two distinct angular orientations of the blade plane with respect to the compartment walls 105 and partitions 106 and/or with means for defining at least two distinct abutment levels at or above the end face 107 for abutment of the end of the knife handle 104 facing the knife blade 101. Thus, in the illustrated embodiment each of the compartments 12 comprises, as most clearly shown in the end face view in FIG. 8c, two sheath-like cavities 108 and 109 crossing each other at right angles to allow the blade 101 of a knife 3 to be positioned with corresponding different angular orientations of the blade plane. Moreover, at the end face 107 of each of compartments 12 wall members 110 of the compartment walls 105 define abutments for the knife handles 104, by which the handle 104 will be positioned at different levels by insertion of the knife blade 101 in one or the other of the sheath-like cavities 108 and 109. Thereby, an individual knife can be positioned either lengthwise or crosswise in each of compartments 12 and at a different level than other knives in the basket 4, as shown in the FIG. 8a, where a knife A is lifted and turned 90° with respect to a knife B. This will allow e.g., an easy distinction of blunt knives, which may stick further up or may be turned with respect to other knives.

As shown in FIGS. 8a and 8b the basket 4 may comprise an interchangeable holder 11 for holding the handle s 104 of the knives 3. The basket 4 may further be provided with handgrips 13 for carrying it and for hanging it on trolleys, which may comprise projecting suspensions, such as bars, that may stick through the handgrips.

FIGS. 9a–9(d) show an embodiment of a glove holding member 14 for supporting protective gloves. The glove holding member 14 is formed substantially in the shape of a human hand with five fingers 15 and is adapted to distend the a protective glove arranged on it in a common plane containing the fingers 15.

In accordance with the invention the fingers 15 are formed by a configuration of bar members 151 mounted in a common base 16 to extend substantially in symmetry with respect to the common plane containing the fingers 15, these bar members 151 being formed to distend the finger members (not illustrated) of a protective glove positioned on the holding member 14 in a direction transverse, e.g. crosswise to the common plane of the fingers 15. In the illustrated embodiment a separate bar member 151 provided for each finger member of a protective glove is formed from a piece of wire material bent into a hair-needle-like shape, as most clearly illustrated in FIG. 9d, and having ends secured in mounting holes 17 provided in the base 16 to be offset from each other in the said direction transverse to the common plane through the fingers 15.

As most clearly shown in FIGS. 9c(1)–9c(3) the common base 16 is provided with distinct sets 171 and 172 of mounting holes 17 for receiving distinct pairs 152 and 153 of extreme bar members 151 as is shown in FIGS. 9d(1) and 9d(2), each of said distinct sets 171 and 172 of mounting holes 17 being positioned along a common line extending transverse to the common plane through the fingers 15 and, as seen in FIGS. 9d(1)–9d(2) the individual extreme bar members 151 of each of said distinct pairs 152 and 153 project from the respective set 171 or 172 of mounting holes 17 with an angular displacement to distend the bar members in the common plane through the fingers 15. Moreover, as also seen in FIGS. 9d(1)–9d(2), a distal end part 154 of the most extreme bar member 151 of each of the distinct pairs 152 and 153 is bent outward from the configuration of bar members 151 in the common plane.

As further illustrated in FIGS. 9d(1)–9d(2), the configuration of bar members 151 constituting the fingers 15 of the glove holding member 14 may be surrounded by a ring member 15', which in order to facilitate positioning and release of a protective glove with respect to the holding member 14 may be arranged to be displaceable in the longitudinal direction of the bar members 151 to bring the bar members 151 closer together from the spread-out shape shown in FIGS. 9d(1)–9d(2) by displacement in a direction towards the distal ends of the bar members 151 and to allow the bar members 151 to spread out from each other by displacement in a direction towards the common base 16.

Figures 10A, 10B:
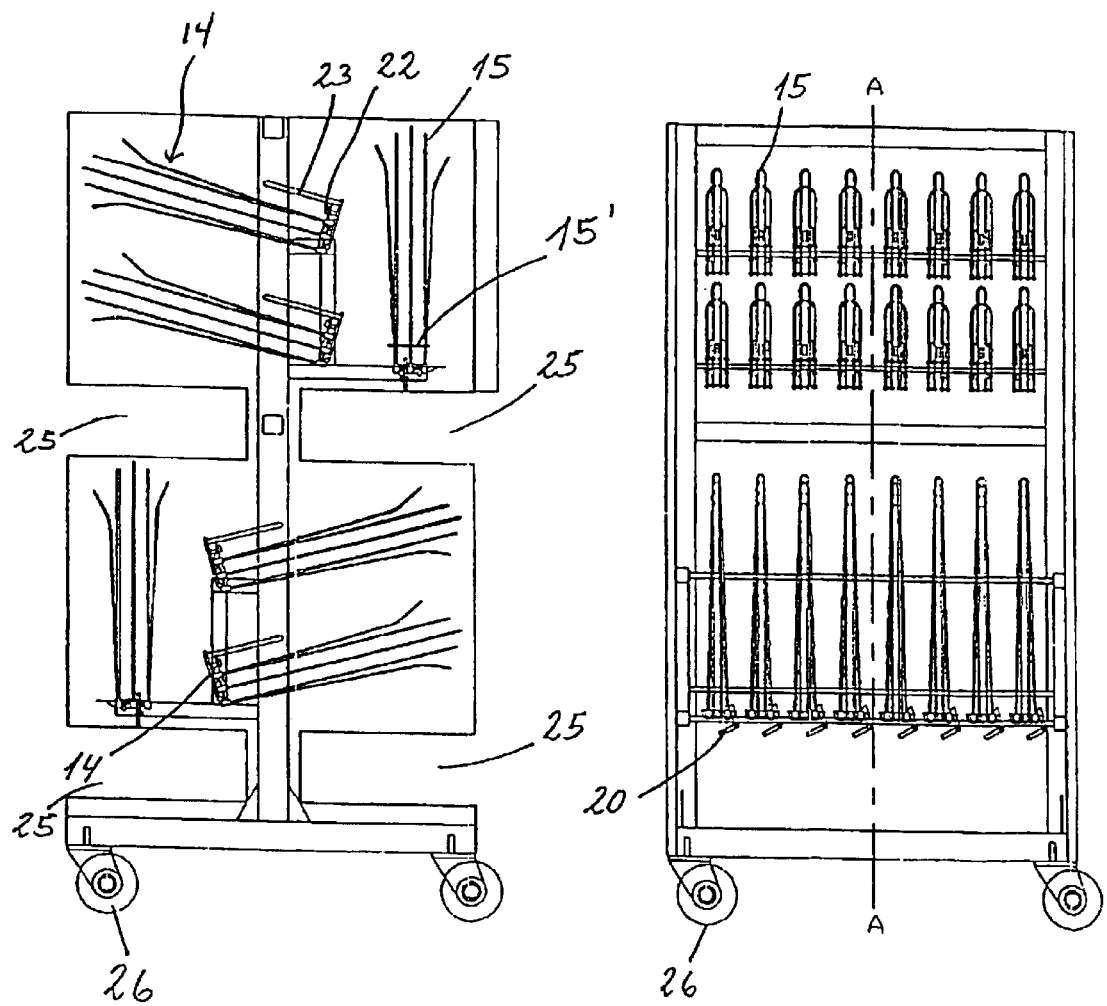
FIGS. 10a and 10b show a first trolley for glove holding members according to the invention.

As shown in FIGS. 10a and 10b a number of glove holding members 14 may be positioned on a trolley with different angular orientations with respect to vertical, such as upstanding or under an angle of 45°.

Figure 9A:
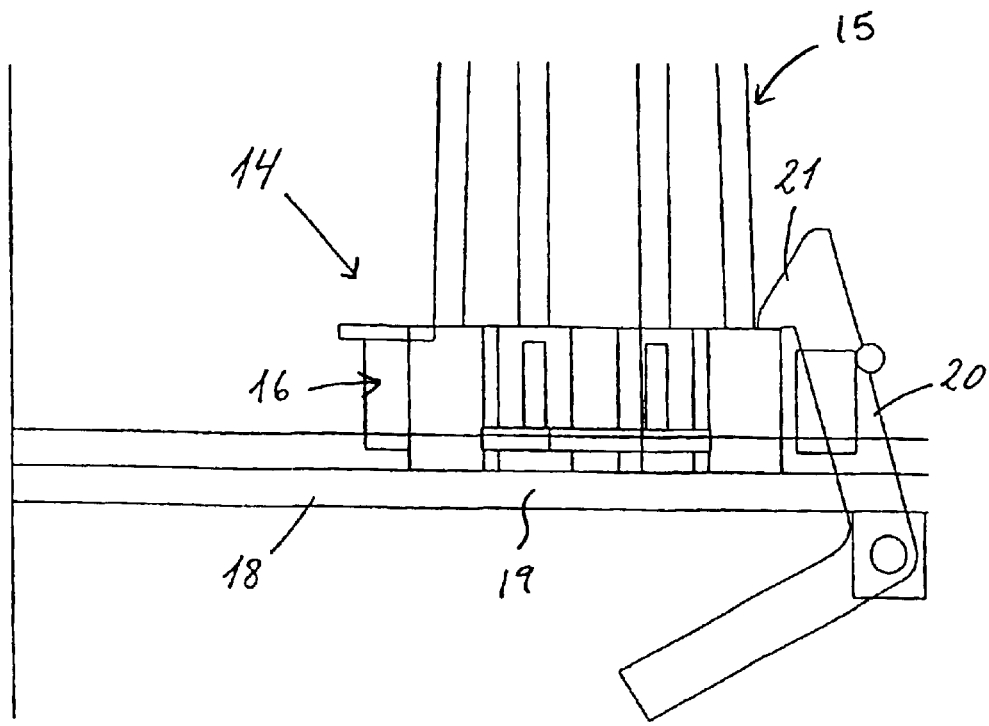
Figure 9B:
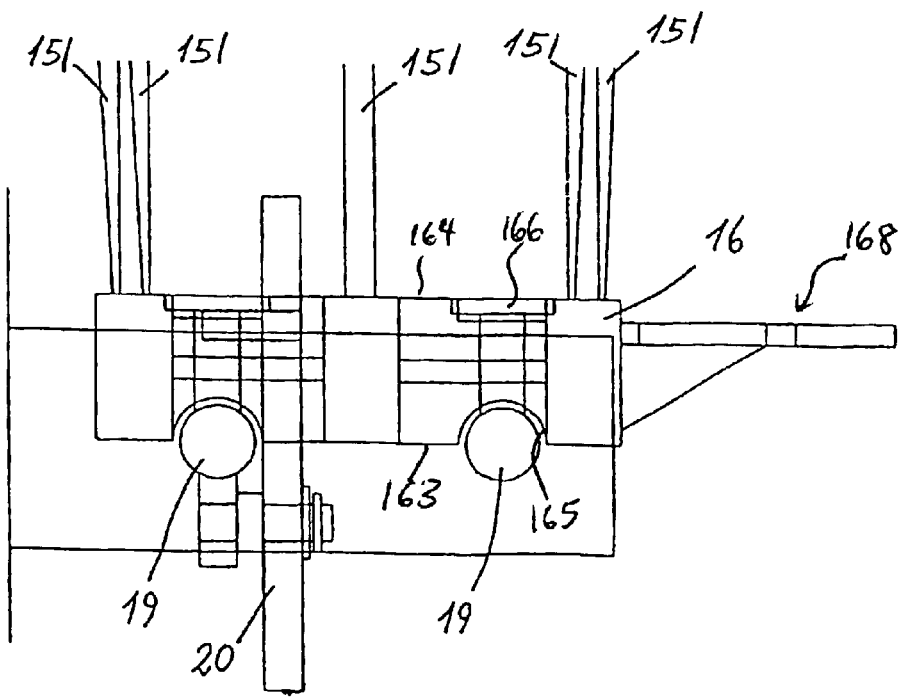

Thus, an upstanding holding member 14 may be positioned on the trolley on securing means 18, which as shown in FIG. 9a comprises tubular support members 19 for supporting the base 16 of the holding member 14, and a locking-device 20 having a pawl member 21 adapted to engage an edge of base 16 of the holding member 14 to ensure that the holding member is fastened to the trolley. For this purpose the base 16 of the holding member 14 may be formed as a substantially rectangular frame structure with end walls 161 and side walls 162 of relatively shallow height, whereby opposed longitudinal edges 163 and 164 of the side walls 162 may be formed with recesses 165 and 166, respectively, engageable by the tubular support member 19 and the pawl member 21 of the locking device 20 provided on the trolley.

Alternatively, the holding member 14 may be hung on the trolley, which for this purpose is provided with one or more projections each formed as a hook member 22, which is engage able with an opening 167 formed in an extension 168 of the base 16 of the glove holding member 14, such that the holding member 14 may be hung onto the hook member 22 guided by a projecting guide member 23 for guiding the holding member 14 with the predetermined angular orientation onto the hook member 22, the guide member 23 being adapted to engage with a recess 24 formed at the end of the extension 168 of the base 16 of the holding member 14. Thereby, it is easier for the user to position a glove holding member 14 on the trolley. The holding member may comprise handgrips for carrying the member.

FIGS. 10a and 10b show a first trolley for glove holding members 14, which may be vertically disposed or under an angle of approximately 45° with respect to vertical on the first trolley. The vertically positioned members are locked by the locking-device 20, and the angled members are hung on the hook and guide member 22, 23.

The trolley comprises recesses 25 in its sidewalls through which the nozzle frames (see FIG. 15) may pass for sluicing/rinsing the gloves. The trolley further comprises wheels 26 for rolling it over the floor. The glove holding member may comprise a ring 15' surrounding the five bent bars for spreading out/bringing together the fingers.

Figure 11B:
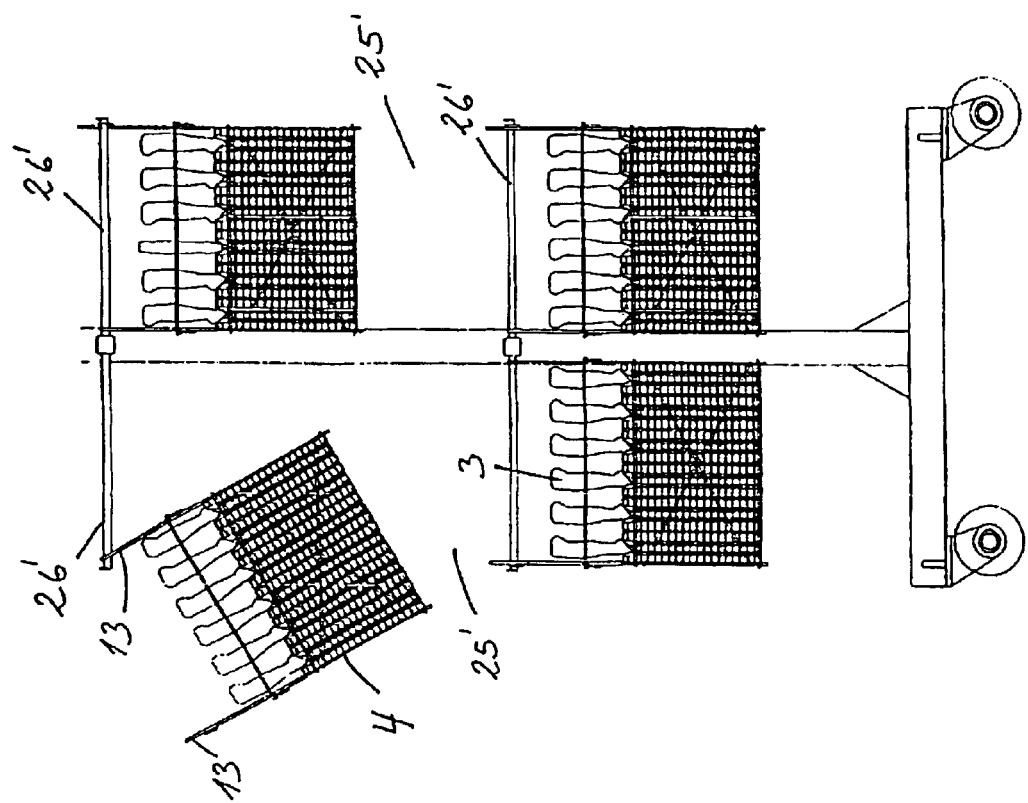
FIGS. 11a and 11b show a first trolley for knives holding members according to the invention.
Figure 11A:
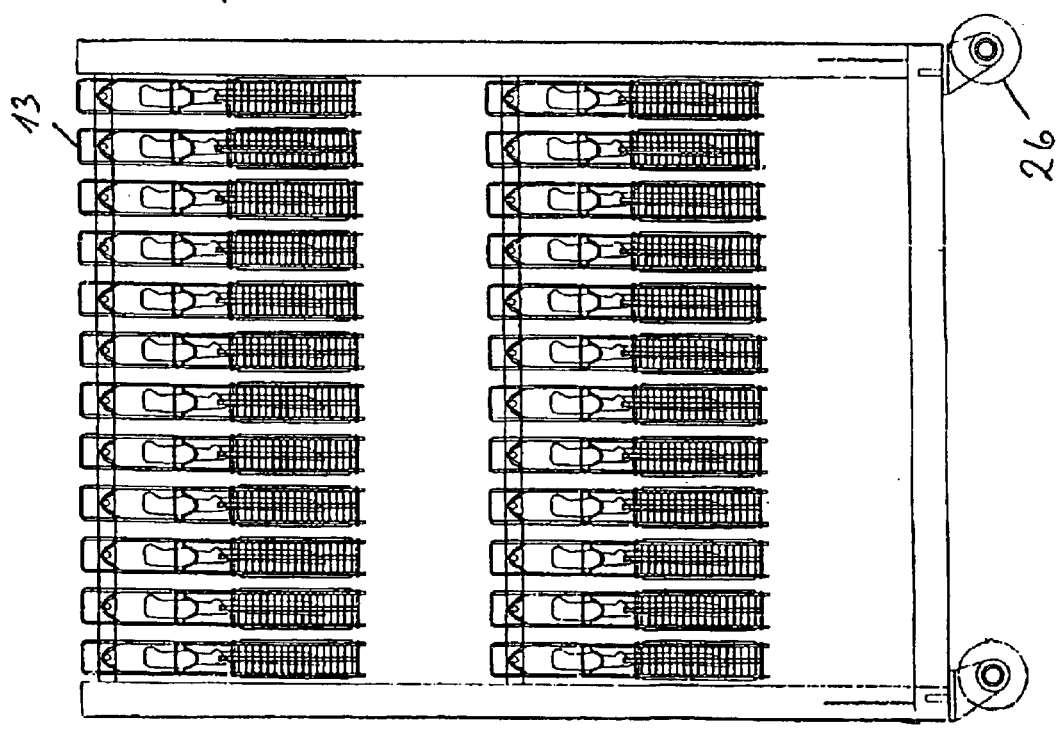

FIGS. 11a and 11b shows a first trolley for knife holding members. The trolley is provided with projecting rail members 26' each sticking through the handgrips 13 of a basket 4 of a knife holding member for hanging it on the trolley. The baskets may be positioned in two layers on each side of the trolley as shown in the figure. In case a basket comprises knives to be ground, the user may hang the basket by only one handgrip 13, such that the basket is suspended under an angle of approximately 45° as shown in the figure. Thus, it is easier for the grinder to locate the baskets containing blunt knives.

The nozzle frames (see FIG. 15) for sluicing/rinsing the knives may pass through the spaces 25' between the two layers of knives. The trolley further comprises rollers 26 for rolling the trolley over the floor.

Figure 12B:
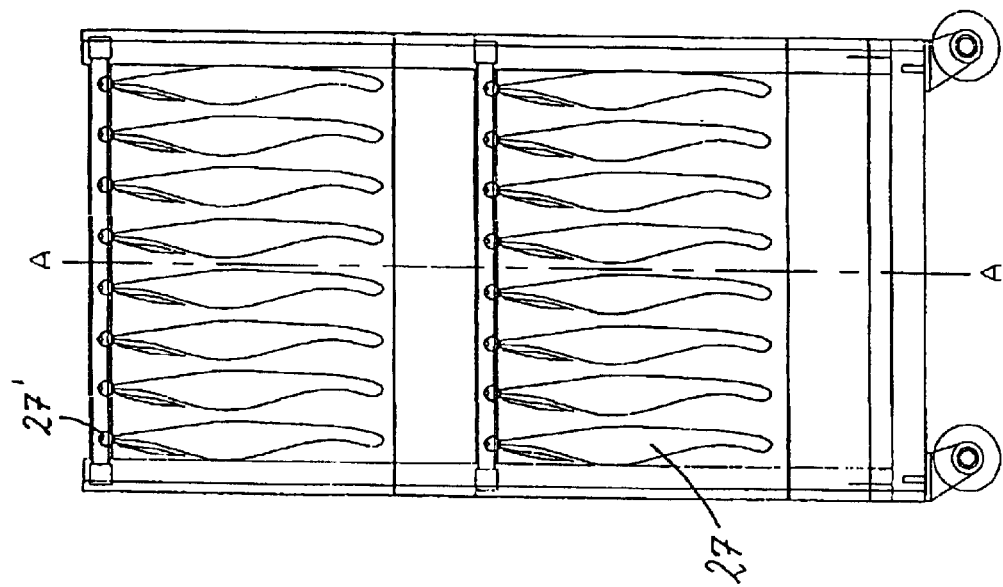
FIGS. 12a and 12b show a first trolley for apron holding members according to the invention.
Figure 12A:
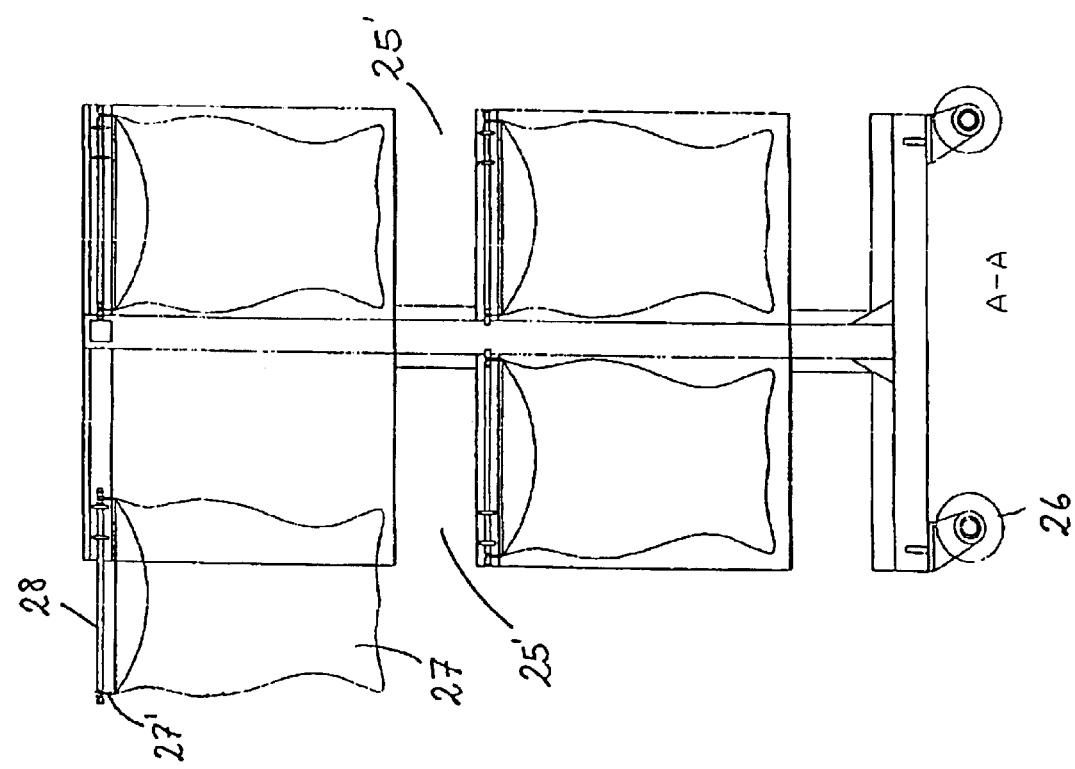

FIGS. 12a and 12b show a first trolley for apron holding members. The aprons 27 are hung in their straps/rings 27' on sliding projections 28. The nozzle frames (see FIG. 15) for sluicing/rinsing the aprons may pass through the spaces 25' between the two layers of aprons. The trolley further comprises rollers 26 for rolling the trolley over the floor.

Figure 13:
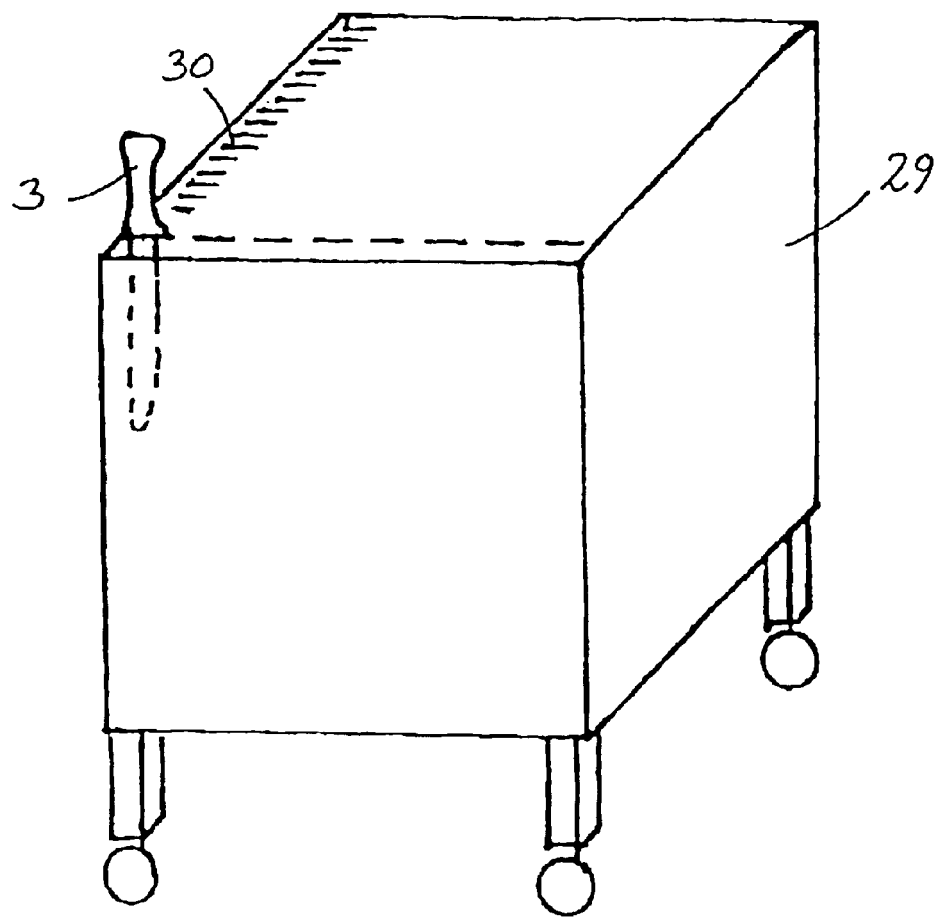
FIG. 13 shows a second trolley according to the invention.

FIG. 13 shows a second trolley 29 for transporting knives to and from a knife grinding system. The trolley 29 comprises a plurality of partitions 30 for the knives 3. The knives may be positioned lengthwise or crosswise in the partitions.

Figure 14:
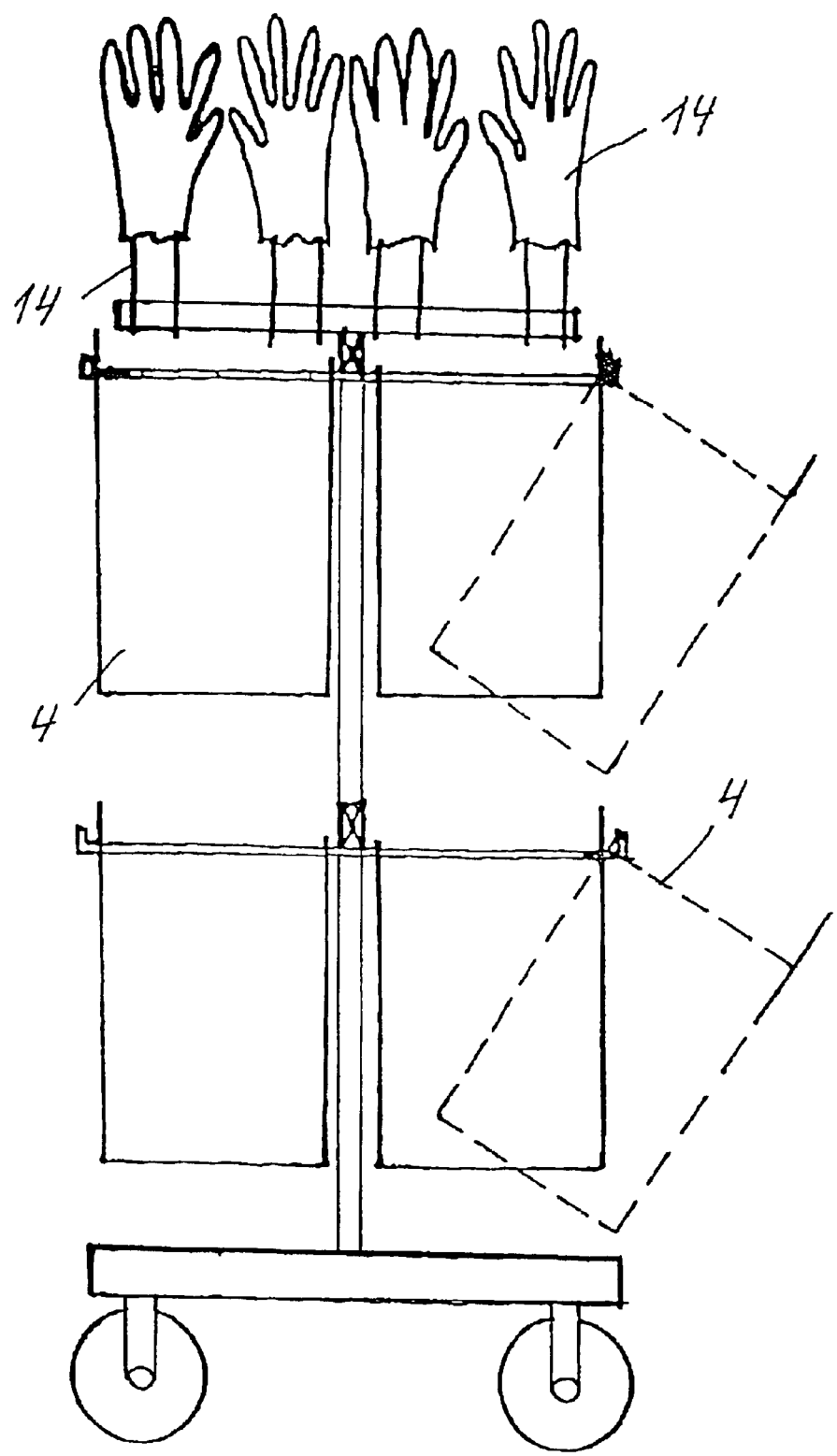
FIG. 14 shows a side view of a first trolley with gloves and knives according to the invention.

FIG. 14 shows a side view of a first trolley wherein glove holding members 14 and baskets 4 are mounted.

Figure 15:
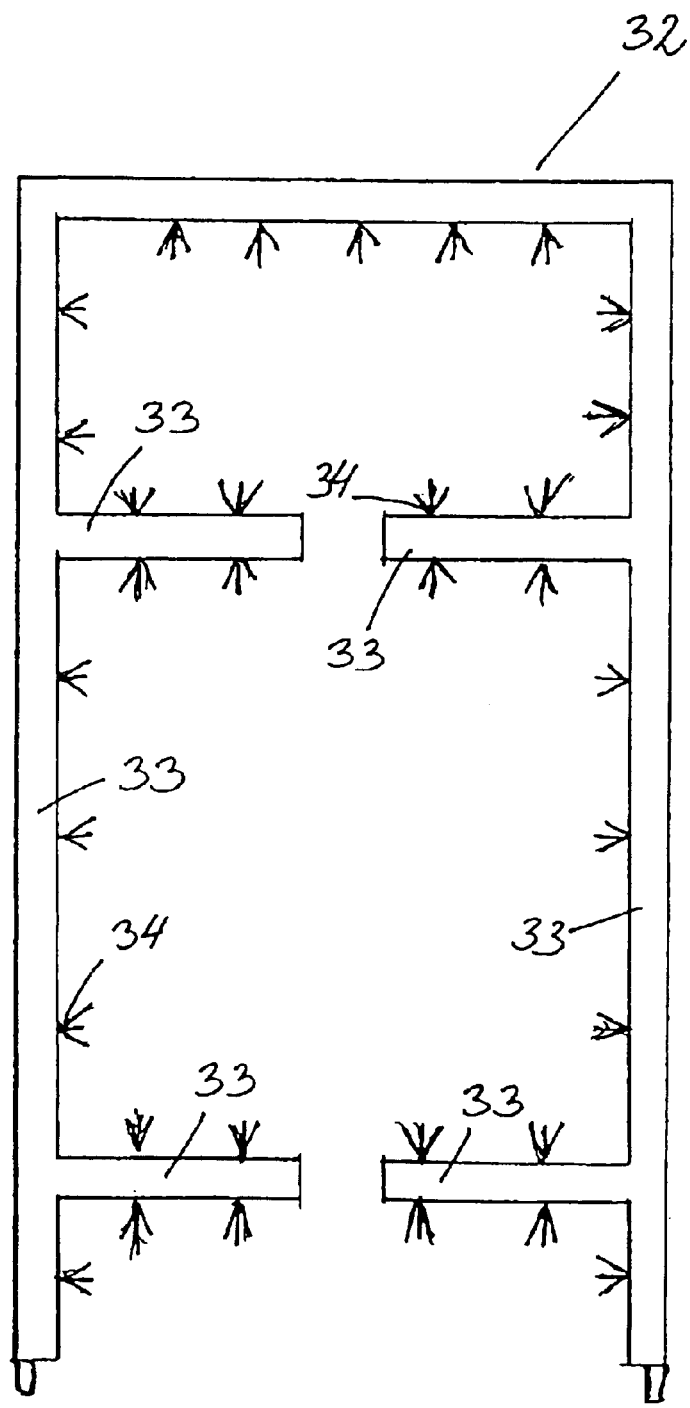
FIGS. 15–16 show embodiments of a cleaning installation according to the invention.
Figure 16:
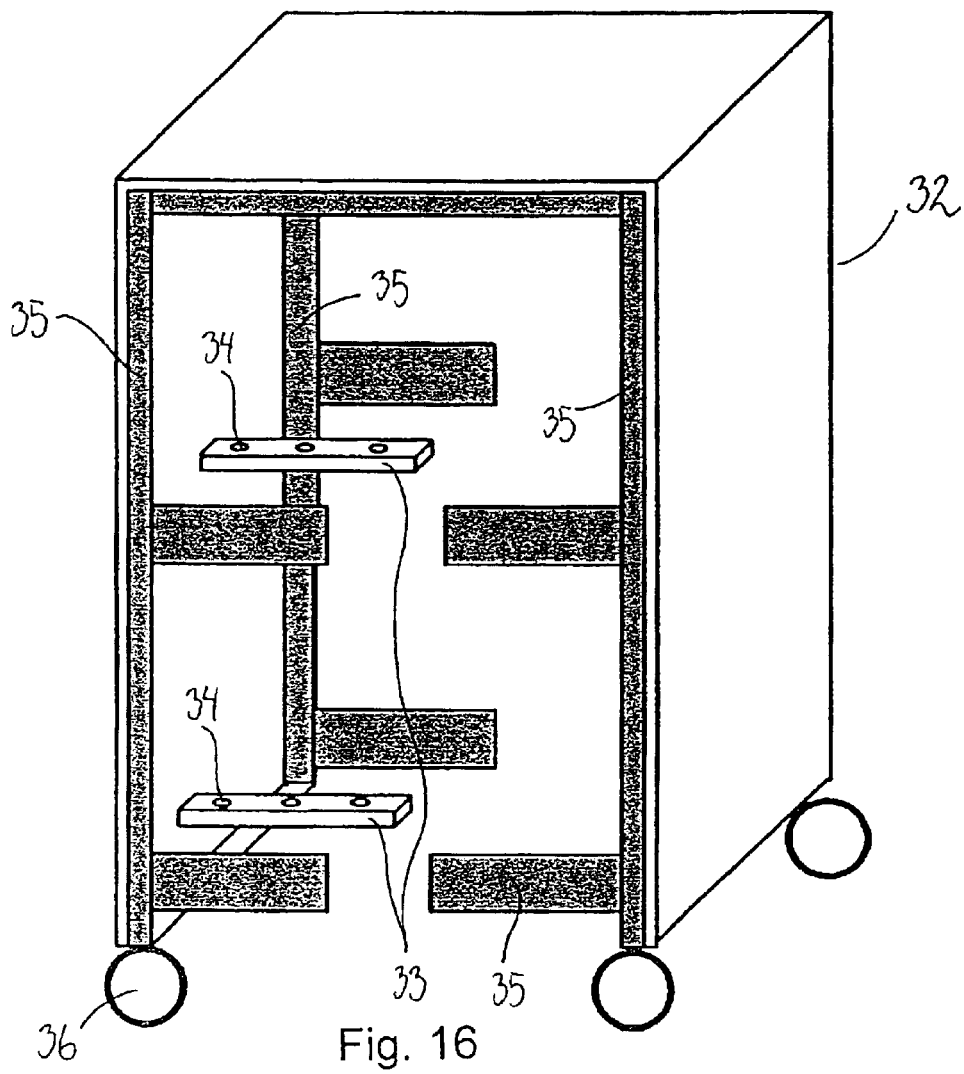

FIGS. 15–16 show embodiments of a cleaning installation. The cleaning installation 32 comprises frames 33 with nozzles 34 mounted thereon, sidewalls and a top wall (the top wall may comprise a hinged cover that can be opened). When passing a first trolley, as shown e.g. in FIGS. 10–12, through the cleaning installation, the nozzle frames pass through the recesses 25 of the trolleys and sluice/sprinkle/ blow liquids and/or steam on the knives and/or gloves and/or aprons. The nozzle frames may be positioned both on the side and over and under the trolleys, such that the nozzles can sprinkle along the side of the trolley, from beneath, from above and in between the layers of equipment on the trolley. Preferably, the nozzle frames are moved in relation to the trolley, but alternatively, the nozzle frames may be stationary and instead the trolleys are moved.

In case the trolley is adapted to transport both knives, gloves and aprons, the trolley may be divided in sections, each section comprising knives, gloves and aprons, respectively. The sections may be separated by vertical extending shielding walls (not shown) that provide a shielding, such that liquid and steam being applied to e.g. the gloves does not enter the section comprising the knives or aprons. Further, the cleaning installation 32 comprises proofing lips 35 that shut tight between the cleaning installation and sidewalls and/or shielding walls of the trolley. Thus, the liquid and/or steam applied to the equipment during cleaning cannot enter the surroundings of the cleaning installation and is thus concentrated around the equipment. The lips may be made of rubber or synthetic material.

The lips 35 may shut tight between the sidewalls of the trolley and the cleaning installation, such that a watertight enclosure (not shown) is provided therebetween. Thus, the cleaning installation may be filled up with water, and circulating the water around it for loosening impurities on the equipment may then clean the equipment. Furthermore, circulation of water may be improved by pumping air into the water. The water may be applied to the enclosure from a basin (not shown) positioned under the cleaning installation. The loosened impurities may float and rinsed away in the top of the cleaning installation or they may be rinsed away through an outflow in the bottom of the cleaning installation.

The cleaning installation comprises wheels 36 such that it is movable. The installation may comprise one or more cleaning units like to the one shown in FIG. 16.

Figure 17:
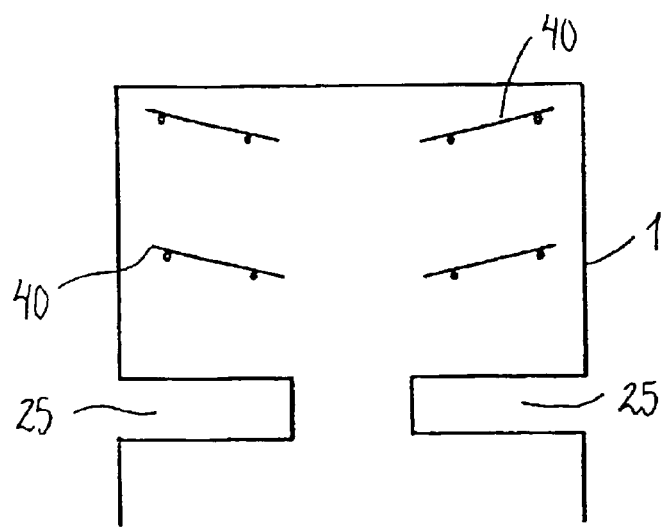
FIGS. 17–18 show a first trolley with glove holding members according to the invention.
Figure 18:
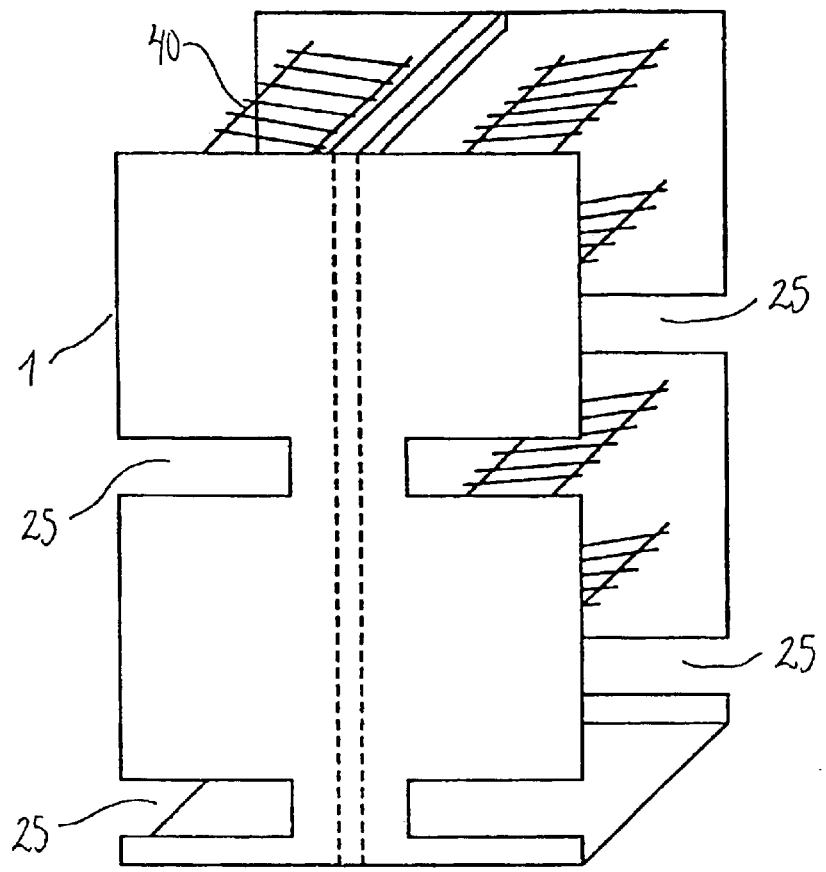
Figure 19:
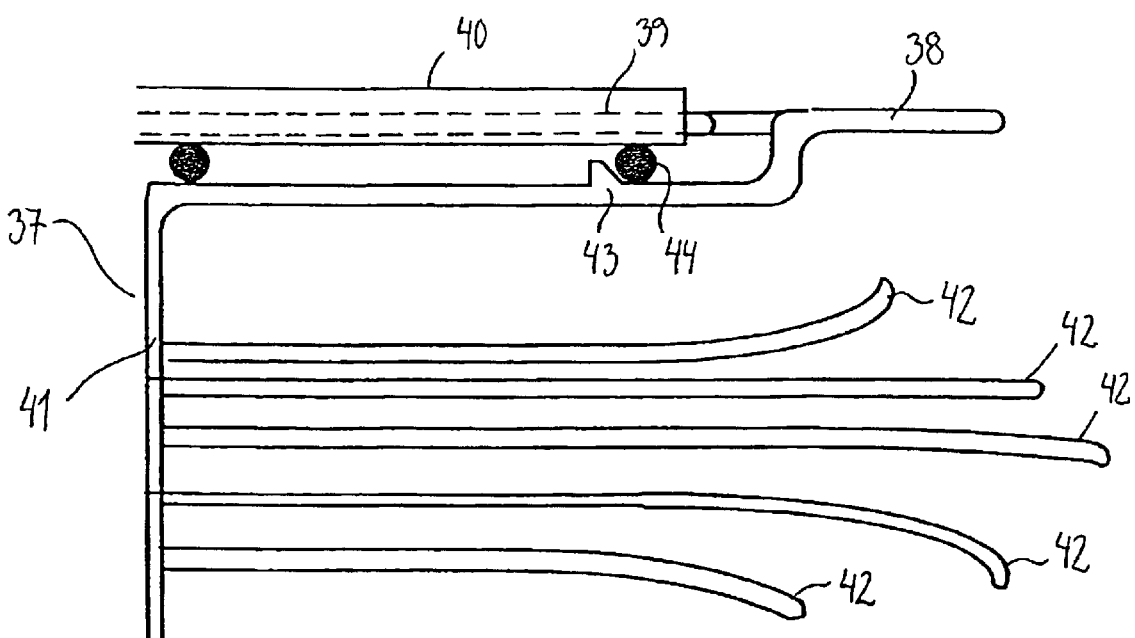
FIG. 19 shows an embodiment of a glove holding member according to the invention.

FIGS. 17–18 show a trolley provided with securing means for securing another embodiment of a glove holding member as shown in FIG. 19. In this embodiment, which is otherwise similar to the embodiment illustrated in FIGS. 9a to 9d the glove holding member 37 comprises a bent bar 38 having a first part 39 engageable with tubular support members 40 on the trolley. The bar 38 comprises a second part 41 onto which the configuration of bar members 42 is mounted, each of which forms a finger of the glove holding member. The bar 38 has a small bent part 43 which locks the holding member 37 with respect to the tubular support members 40, when it has passed the bulge 44. As shown in FIGS. 17–18 the trolley 1 may be provided with sidewalls having recesses 25 through which the nozzle frames may pass. The trolley may comprise wheels.

Figure 20:
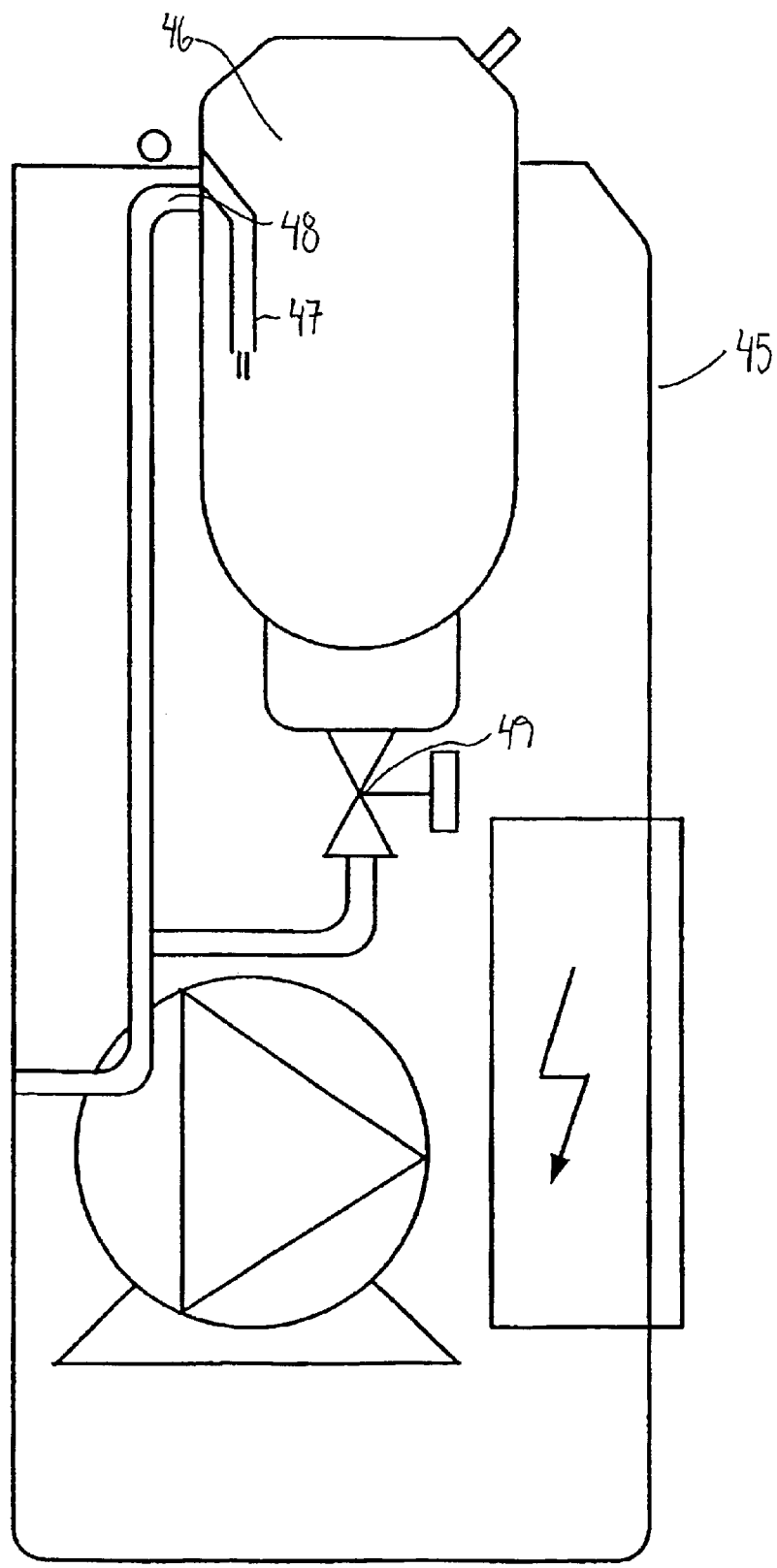
FIG. 20 shows a basin washer according to the invention.

FIG. 20 shows a basin washer 45 according to the invention. The knives, gloves or aprons are put into the basin 46 and water is filled into the basin from the tap 47. The circulating water will loosen impurities, and the impurities will float and be rinsed away through the outflow 48. The basin can be emptied through the bottom outflow 49.

Figure 21:
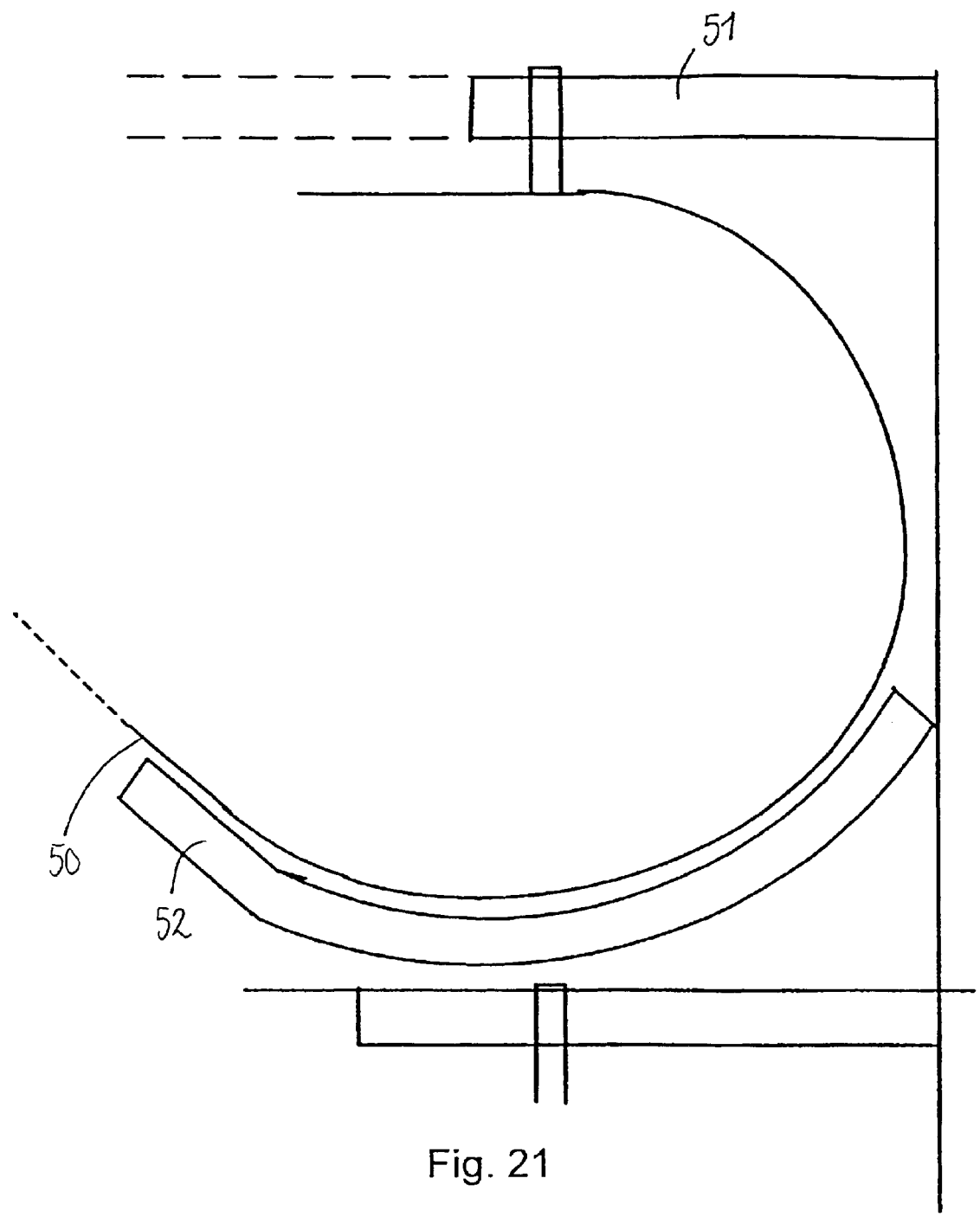
FIGS. 21–22 show a basin according to the invention.
Figure 22:
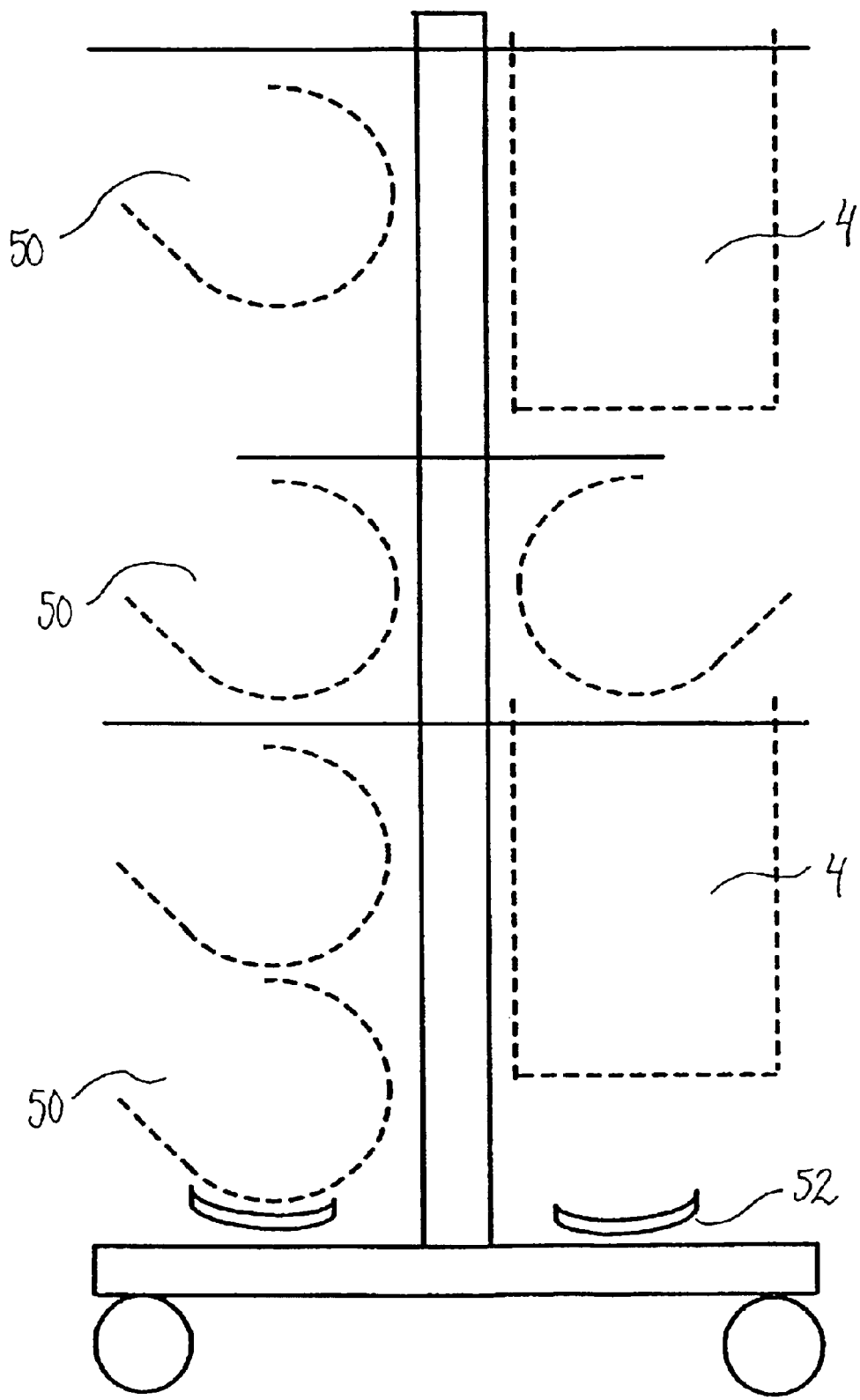

FIGS. 21–22 show a basin that is hung on a first trolley. The basin 50 is hung on projections/hooks 51 and is supported by a cradle-like member 52. The basin may comprise user-identification plates so as to ensure that the user always receives his own equipment after cleaning. Preferably, each user may have his own basin. The basin containing the equipment may be removed from the trolley and positioned in the basin washer, wherein the equipment is cleaned as described above, cf. FIG. 20. FIG. 21 shows a first trolley having baskets 4 for knives and basins 50 for gloves and aprons mounted thereon. The basins may have various lengths, and each basin may be divided into sections by wall. The basin may be supported by the cradle-like members 52.

What is claimed is:

1. A glove holding member for supporting protective gloves in a system for transporting and/or cleaning of slaughter equipment, said member being formed substantially in the shape of a human hand with five fingers, the fingers being formed by a configuration of bar members mounted in a common base and being adapted to distend a protective glove positioned in a common plane containing the fingers, each bar member being formed from wire material having ends secured in two mounting holes provided in said base and being bent into a hair-needle shape adapted to distend a corresponding finger member of the protective glove in a direction transverse to said common plane.

2. A glove holding member as claimed in claim 1, wherein said configuration of bar members includes two distinct pairs of outer bar members,
   a first of the two distinct pairs of outer bar members having ends secured in a first distinct set of the mounting holes, and a second of the two distinct pairs of outer bar members having ends secured in a second distinct set of the mounting holes,
   the first distinct pair being positioned in the base along a first common line transverse to said common plane, and the second distinct pair being positioned in the base along a second common line transverse to said common plane,
   the outer bar members projecting from the mounting holes with angular displacement.

3. A glove holding member as claimed in claim 2, wherein each of said two distinct pairs of outer bar members includes an outermost bar member, and a distal end part of each outermost bar member is bent outward from the configuration of bar members in said common plane.

4. A glove holding member as claimed in claim 1, wherein the configuration of bar members is surrounded by a ring member arranged to be displaceable in the longitudinal direction of the bar members to bring the bar members together by displacement in a direction towards distal ends of the bar members and to allow the bar members to spread out from each other by displacement in a direction towards the base.

5. A glove holding member as claimed in claim 1, wherein each bar member is individually formed from a single piece of wire material for which said mounting holes are offset from each other in a direction transverse to said common plane.

6. A combination of a glove holding member for supporting protective gloves in a slaughterhouse and a system for transporting and/or cleaning of slaughterhouse equipment, said system comprising at least one transporting and/or cleaning device for slaughter equipment, said device being provided with a stationary glove holder mounting means for holding said glove holding member formed substantially in the shape of a human hand with five fingers and formed by a configuration of bar members mounted in a common base provided with an engagement means for releasable engagement with said glove holder mounting means, said glove holder mounting means comprising a projecting hook member and a projecting guide member and said engagement means comprising an extension of said base of the glove holding member provided with an opening for engagement with said hook member and a recess engageable by said guide member.

7. The combination claimed in claim 6, wherein said glove holder mounting means comprise a support member and a releasable pawl member, and the base of the glove holding member comprises a substantially rectangular frame structure with end walls and side walls, opposed longitudinal edges of said side walls are each formed with a recess, wherein the recesses are engageable by the support member and the releasable pawl member, respectively.

8. The combination claimed in claim 6, wherein said glove holder mounting means comprises tubular support members and the base of the glove holding member comprises a bent bar having a first part engageable with said tubular support members and a second part for locking the glove holding member with respect to the tubular support members.

9. The combination claimed in claim 6, wherein said transporting and/or cleaning device comprises a trolley for transportation of slaughter equipment to and from a cleaning installation, said glove holder mounting means being provided by said trolley.

10. The combination claimed in claim 9, wherein additional mounting means for knife holding baskets and/or aprons are provided by said trolley.

* * * * *